United States Patent
Kusens et al.

(10) Patent No.: US 10,504,226 B2
(45) Date of Patent: *Dec. 10, 2019

(54) SEIZURE DETECTION

(71) Applicant: CERNER INNOVATION, INC., Kansas City, KS (US)

(72) Inventors: Michael Kusens, Cooper City, FL (US); Neil Kusens, Sherman Oaks, CA (US)

(73) Assignee: Cerner Innovation, Inc., Kansas City, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,684

(22) Filed: Jun. 27, 2019

(65) Prior Publication Data

US 2019/0318478 A1    Oct. 17, 2019

Related U.S. Application Data

(63) Continuation of application No. 16/158,729, filed on Oct. 12, 2018, now Pat. No. 10,388,016, which is a
(Continued)

(51) Int. Cl.
*A61B 6/00* (2006.01)
*G06K 9/00* (2006.01)
(Continued)

(52) U.S. Cl.
CPC .......... *G06T 7/0012* (2013.01); *G06T 7/0016* (2013.01); *G06T 7/246* (2017.01);
(Continued)

(58) Field of Classification Search
USPC ............... 382/100, 103, 106–107, 128–133, 382/154–155, 162, 168, 173, 181, 190,
(Continued)

(56) References Cited

U.S. PATENT DOCUMENTS 4,669,263 A    6/1987    Sugiyama
4,857,716 A    8/1989    Gombrich et al.
(Continued)

FOREIGN PATENT DOCUMENTS

| DE | 19844918 A1 | 4/2000 |
|----|---|---|
| WO | 2009/018422 A1 | 2/2009 |
| WO | 2012/122002 A1 | 9/2012 |

OTHER PUBLICATIONS

Notice of Allowance received for U.S. Appl. No. 16/380,013, dated Jul. 10, 2019, 10 pages.
(Continued)

*Primary Examiner* — Seyed H Azarian
(74) *Attorney, Agent, or Firm* — Shook, Hardy & Bacon, LLP

(57) ABSTRACT

Systems, methods and media for detecting a seizure use one or more 3D cameras to monitor an individual. The 3D cameras may movements associated with the tonic or clonic phases of a seizure. A detection zone is used to monitor the individual via the one or more 3D cameras. As the individual moves, the detection zone is automatically adjusted such that zone remains around the person. Detected body position and/or movements, including rate of movement and duration of movement, consistent with a seizure may cause the system or media to alert the individual, a central monitoring system, caregivers, and/or others.

16 Claims, 21 Drawing Sheets

Related U.S. Application Data continuation of application No. 15/396,263, filed on Dec. 30, 2016, now Pat. No. 10,147,184.

(51) Int. Cl.
  *G06T 7/00* (2017.01)
  *G08B 21/04* (2006.01)
  *G06T 7/246* (2017.01)

(52) U.S. Cl.
  CPC ....... *G08B 21/043* (2013.01); *G08B 21/0476* (2013.01); *G06T 2207/10016* (2013.01); *G06T 2207/30004* (2013.01); *G06T 2207/30196* (2013.01)

(58) Field of Classification Search
  USPC ....... 382/199, 203, 209, 214, 219, 232, 254, 382/274, 276, 286–291, 305, 312; 600/474, 476; 348/135, 222.1; 705/2; 340/539.12
  See application file for complete search history.

(56) References Cited

U.S. PATENT DOCUMENTS

| | | |
|---|---|---|
| 5,031,228 A | 7/1991 | Lu |
| 5,276,432 A | 1/1994 | Travis |
| 5,448,221 A | 9/1995 | Weller |
| 5,482,050 A | 1/1996 | Smokoff et al. |
| 5,592,153 A | 1/1997 | Welling et al. |
| 5,798,798 A | 8/1998 | Rector et al. |
| 5,838,223 A | 11/1998 | Gallant et al. |
| 5,915,379 A | 6/1999 | Wallace et al. |
| 5,942,986 A | 8/1999 | Shabot et al. |
| 6,050,940 A | 4/2000 | Braun et al. |
| 6,095,984 A | 8/2000 | Amano et al. |
| 6,160,478 A * | 12/2000 | Jacobsen ............... G16H 50/20 340/539.12 |
| 6,174,283 B1 | 1/2001 | Nevo et al. |
| 6,188,407 B1 | 2/2001 | Smith et al. |
| 6,269,812 B1 | 8/2001 | Wallace et al. |
| 6,287,452 B1 | 9/2001 | Allen et al. |
| 6,322,502 B1 | 11/2001 | Schoenberg et al. |
| 6,369,838 B1 | 4/2002 | Wallace et al. |
| 6,429,869 B1 | 8/2002 | Kamakura et al. |
| 6,614,349 B1 | 9/2003 | Proctor et al. |
| 6,727,818 B1 | 4/2004 | Wildman et al. |
| 6,804,656 B1 | 10/2004 | Rosenfeld et al. |
| 7,015,816 B2 | 3/2006 | Wildman et al. |
| 7,122,005 B2 | 10/2006 | Shusterman |
| 7,154,397 B2 | 12/2006 | Zerhusen et al. |
| 7,237,287 B2 | 7/2007 | Weismiller et al. |
| 7,323,991 B1 | 1/2008 | Eckert et al. |
| 7,408,470 B2 | 8/2008 | Wildman et al. |
| 7,420,472 B2 | 9/2008 | Tran |
| 7,430,608 B2 | 9/2008 | Noonan et al. |
| 7,502,498 B2 | 3/2009 | Wen et al. |
| 7,612,679 B1 | 11/2009 | Fackler et al. |
| 7,669,263 B2 | 3/2010 | Menkedick et al. |
| 7,715,387 B2 | 5/2010 | Schuman |
| 7,724,147 B2 | 5/2010 | Brown |
| 7,756,723 B2 | 7/2010 | Rosow et al. |
| 7,890,349 B2 | 2/2011 | Cole et al. |
| 7,895,055 B2 | 2/2011 | Schneider et al. |
| 7,908,153 B2 | 3/2011 | Scherpbier et al. |
| 7,945,457 B2 | 5/2011 | Zaleski |
| 7,962,544 B2 | 6/2011 | Torok et al. |
| 7,972,140 B2 | 7/2011 | Renaud |
| 8,108,036 B2 | 1/2012 | Tran |
| 8,123,685 B2 | 2/2012 | Brauers et al. |
| 8,224,108 B2 | 7/2012 | Steinberg et al. |
| 8,237,558 B2 | 8/2012 | Seyed Momen et al. |
| 8,273,018 B1 | 9/2012 | Fackler et al. |
| 8,432,263 B2 | 4/2013 | Kunz |
| 8,451,314 B1 | 5/2013 | Cline et al. |
| 8,529,448 B2 | 9/2013 | McNair |
| 8,565,500 B2 | 10/2013 | Neff |
| 8,620,682 B2 | 12/2013 | Bechtel et al. |
| 8,655,680 B2 | 2/2014 | Bechtel et al. |
| 8,700,423 B2 | 4/2014 | Eaton, Jr. et al. |
| 8,727,981 B2 | 5/2014 | Bechtel et al. |
| 8,769,153 B2 | 7/2014 | Dziubinski |
| 8,890,937 B2 | 11/2014 | Skubic et al. |
| 8,902,068 B2 | 12/2014 | Bechtel et al. |
| 8,917,186 B1 | 12/2014 | Grant |
| 8,953,886 B2 | 2/2015 | King et al. |
| 9,072,929 B1 | 7/2015 | Rush et al. |
| 9,129,506 B1 | 9/2015 | Kusens |
| 9,147,334 B2 | 9/2015 | Long et al. |
| 9,159,215 B1 * | 10/2015 | Kusens ................. G08B 21/22 |
| 9,269,012 B2 | 2/2016 | Fotland |
| 9,292,089 B1 | 3/2016 | Sadek |
| 9,305,191 B2 | 4/2016 | Long et al. |
| 9,408,561 B2 | 8/2016 | Stone et al. |
| 9,489,820 B1 | 11/2016 | Kusens |
| 9,519,969 B1 | 12/2016 | Kusens |
| 9,524,443 B1 | 12/2016 | Kusens |
| 9,536,310 B1 | 1/2017 | Kusens |
| 9,538,158 B1 | 1/2017 | Rush et al. |
| 9,563,955 B1 | 2/2017 | Kamarshi et al. |
| 9,597,016 B2 | 3/2017 | Stone et al. |
| 9,729,833 B1 | 8/2017 | Kusens |
| 9,741,227 B1 | 8/2017 | Kusens |
| 9,892,310 B2 | 2/2018 | Kusens et al. |
| 9,892,311 B2 | 2/2018 | Kusens et al. |
| 9,892,611 B1 | 2/2018 | Kusens |
| 9,905,113 B2 | 2/2018 | Kusens |
| 10,096,223 B1 | 10/2018 | Kusens |
| 10,210,378 B2 | 2/2019 | Kusens et al. |
| 2002/0015034 A1 | 2/2002 | Malmborg |
| 2002/0077863 A1 | 6/2002 | Rutledge et al. |
| 2002/0101349 A1 | 8/2002 | Rojas, Jr. |
| 2002/0115905 A1 | 8/2002 | August |
| 2002/0183976 A1 | 12/2002 | Pearce |
| 2003/0037786 A1 | 2/2003 | Biondi et al. |
| 2003/0070177 A1 | 4/2003 | Kondo et al. |
| 2003/0092974 A1 | 5/2003 | Santoso et al. |
| 2003/0095147 A1 | 5/2003 | Daw |
| 2003/0135390 A1 | 7/2003 | O'brien et al. |
| 2003/0140928 A1 | 7/2003 | Bui et al. |
| 2003/0227386 A1 | 12/2003 | Pulkkinen et al. |
| 2004/0019900 A1 | 1/2004 | Knightbridge et al. |
| 2004/0052418 A1 | 3/2004 | Delean |
| 2004/0054760 A1 | 3/2004 | Ewing et al. |
| 2004/0097227 A1 | 5/2004 | Siegel |
| 2004/0116804 A1 | 6/2004 | Mostafavi |
| 2004/0193449 A1 | 9/2004 | Wildman et al. |
| 2005/0038326 A1 | 2/2005 | Mathur |
| 2005/0182305 A1 | 8/2005 | Hendrich |
| 2005/0231341 A1 | 10/2005 | Shimizu |
| 2005/0249139 A1 | 11/2005 | Nesbit |
| 2006/0004606 A1 | 1/2006 | Wendl et al. |
| 2006/0047538 A1 | 3/2006 | Condurso et al. |
| 2006/0049936 A1 | 3/2006 | Collins et al. |
| 2006/0058587 A1 | 3/2006 | Heimbrock et al. |
| 2006/0089541 A1 | 4/2006 | Braun et al. |
| 2006/0092043 A1 | 5/2006 | Lagassey |
| 2006/0107295 A1 | 5/2006 | Margis et al. |
| 2006/0145874 A1 | 7/2006 | Fredriksson et al. |
| 2006/0261974 A1 | 11/2006 | Albert et al. |
| 2007/0085690 A1 | 4/2007 | Tran |
| 2007/0118054 A1 | 5/2007 | Pinhas et al. |
| 2007/0120689 A1 | 5/2007 | Zerhusen et al. |
| 2007/0129983 A1 | 6/2007 | Scherpbier et al. |
| 2007/0136218 A1 | 6/2007 | Bauer et al. |
| 2007/0159332 A1 | 7/2007 | Koblasz |
| 2007/0279219 A1 | 12/2007 | Warriner |
| 2007/0296600 A1 | 12/2007 | Dixon et al. |
| 2008/0001735 A1 | 1/2008 | Tran |
| 2008/0001763 A1 | 1/2008 | Raja et al. |
| 2008/0002860 A1 | 1/2008 | Super et al. |
| 2008/0004904 A1 * | 1/2008 | Tran .................... A61B 5/0006 705/2 |
| 2008/0009686 A1 | 1/2008 | Hendrich |

(56) References Cited

U.S. PATENT DOCUMENTS

| | | |
|---|---|---|
| 2008/0015903 A1 | 1/2008 | Rodgers |
| 2008/0021731 A1 | 1/2008 | Rodgers |
| 2008/0071210 A1 | 3/2008 | Moubayed et al. |
| 2008/0087719 A1 | 4/2008 | Sahud |
| 2008/0106374 A1 | 5/2008 | Sharbaugh |
| 2008/0126132 A1 | 5/2008 | Warner et al. |
| 2008/0228045 A1 | 9/2008 | Gao et al. |
| 2008/0249376 A1 | 10/2008 | Zaleski |
| 2008/0267447 A1 | 10/2008 | Kelusky et al. |
| 2008/0277486 A1 | 11/2008 | Seem et al. |
| 2008/0281638 A1 | 11/2008 | Weatherly et al. |
| 2009/0082829 A1 | 3/2009 | Panken et al. |
| 2009/0091458 A1 | 4/2009 | Deutsch |
| 2009/0099480 A1 | 4/2009 | Salgo et al. |
| 2009/0112630 A1 | 4/2009 | Collins et al. |
| 2009/0119843 A1 | 5/2009 | Rodgers et al. |
| 2009/0177327 A1 | 7/2009 | Turner |
| 2009/0224924 A1 | 9/2009 | Thorp |
| 2009/0278934 A1 | 11/2009 | Ecker et al. |
| 2009/0322513 A1 | 12/2009 | Hwang et al. |
| 2010/0117836 A1 | 5/2010 | Seyed momen et al. |
| 2010/0169114 A1 | 7/2010 | Henderson et al. |
| 2010/0169120 A1 | 7/2010 | Herbst et al. |
| 2010/0172567 A1 | 7/2010 | Prokoski |
| 2010/0176952 A1 | 7/2010 | Bajcsy et al. |
| 2010/0188228 A1 | 7/2010 | Hyland |
| 2010/0245577 A1 | 9/2010 | Yamamoto et al. |
| 2010/0285771 A1 | 11/2010 | Peabody |
| 2010/0305466 A1 | 12/2010 | Corn |
| 2011/0018709 A1 | 1/2011 | Kornbluh |
| 2011/0022981 A1 | 1/2011 | Mahajan et al. |
| 2011/0025493 A1 | 2/2011 | Papadopoulos et al. |
| 2011/0025499 A1 | 2/2011 | Hoy et al. |
| 2011/0035057 A1 | 2/2011 | Receveur et al. |
| 2011/0035466 A1 | 2/2011 | Panigrahi |
| 2011/0054936 A1 | 3/2011 | Cowan et al. |
| 2011/0068930 A1 | 3/2011 | Wildman et al. |
| 2011/0077965 A1 | 3/2011 | Nolte et al. |
| 2011/0087079 A1 | 4/2011 | Aarts |
| 2011/0087707 A1 | 4/2011 | Abraham |
| 2011/0102133 A1 | 5/2011 | Shaffer |
| 2011/0102181 A1 | 5/2011 | Metz et al. |
| 2011/0106560 A1 | 5/2011 | Eaton et al. |
| 2011/0106561 A1 | 5/2011 | Eaton et al. |
| 2011/0175809 A1 | 7/2011 | Markovic et al. |
| 2011/0190593 A1 | 8/2011 | McNair |
| 2011/0227740 A1 | 9/2011 | Wohltjen |
| 2011/0245707 A1 | 10/2011 | Castle et al. |
| 2011/0254682 A1 | 10/2011 | Sigrist Christensen |
| 2011/0288811 A1 | 11/2011 | Greene |
| 2011/0295621 A1 | 12/2011 | Farooq et al. |
| 2011/0301440 A1 | 12/2011 | Riley et al. |
| 2011/0313325 A1 | 12/2011 | Cuddihy |
| 2012/0025991 A1 | 2/2012 | O'keefe et al. |
| 2012/0026308 A1 | 2/2012 | Johnson et al. |
| 2012/0075464 A1* | 3/2012 | Derenne ............ A61B 5/0013 348/135 |
| 2012/0092162 A1 | 4/2012 | Rosenberg |
| 2012/0098918 A1 | 4/2012 | Murphy |
| 2012/0140068 A1 | 6/2012 | Monroe et al. |
| 2012/0154582 A1 | 6/2012 | Johnson et al. |
| 2012/0212582 A1 | 8/2012 | Deutsch |
| 2012/0259650 A1 | 10/2012 | Mallon et al. |
| 2012/0314901 A1 | 12/2012 | Hanson et al. |
| 2013/0027199 A1 | 1/2013 | Bonner |
| 2013/0028570 A1 | 1/2013 | Suematsu et al. |
| 2013/0120120 A1 | 5/2013 | Long et al. |
| 2013/0122807 A1 | 5/2013 | Tenarvitz et al. |
| 2013/0184592 A1* | 7/2013 | Venetianer ............ H04N 7/18 600/476 |
| 2013/0265482 A1 | 10/2013 | Funamoto |
| 2013/0309128 A1 | 11/2013 | Voegeli et al. |
| 2013/0332184 A1 | 12/2013 | Burnham et al. |
| 2014/0039351 A1 | 2/2014 | Mix et al. |
| 2014/0070950 A1 | 3/2014 | Snodgrass |
| 2014/0085501 A1* | 3/2014 | Tran ............ H04N 5/23238 348/222.1 |
| 2014/0086450 A1 | 3/2014 | Huang et al. |
| 2014/0155755 A1* | 6/2014 | Pinter ............ A61B 5/0008 600/474 |
| 2014/0191861 A1 | 7/2014 | Scherrer |
| 2014/0267625 A1 | 9/2014 | Clark et al. |
| 2014/0267736 A1 | 9/2014 | DeLean |
| 2014/0327545 A1 | 11/2014 | Bolling et al. |
| 2014/0328512 A1 | 11/2014 | Gurwicz et al. |
| 2014/0333744 A1 | 11/2014 | Baym et al. |
| 2014/0333776 A1 | 11/2014 | Dedeoglu et al. |
| 2014/0354436 A1 | 12/2014 | Nix et al. |
| 2014/0365242 A1 | 12/2014 | Neff |
| 2015/0109442 A1 | 4/2015 | Derenne et al. |
| 2015/0206415 A1 | 7/2015 | Wegelin et al. |
| 2015/0269318 A1 | 9/2015 | Neff |
| 2015/0278456 A1 | 10/2015 | Bermudez rodriguez et al. |
| 2015/0294143 A1 | 10/2015 | Wells et al. |
| 2016/0022218 A1 | 1/2016 | Hayes |
| 2016/0070869 A1 | 3/2016 | Portnoy |
| 2016/0093195 A1 | 3/2016 | Ophardt |
| 2016/0127641 A1 | 5/2016 | Gove |
| 2016/0217347 A1 | 7/2016 | Mineo |
| 2016/0253802 A1 | 9/2016 | Venetianer et al. |
| 2016/0267327 A1 | 9/2016 | Franz et al. |
| 2016/0360970 A1 | 12/2016 | Tzvieli et al. |
| 2017/0055917 A1 | 3/2017 | Stone et al. |
| 2017/0143240 A1 | 5/2017 | Stone et al. |
| 2017/0337682 A1 | 11/2017 | Liao et al. |
| 2018/0018864 A1 | 7/2018 | Kusens et al. |
| 2018/0189946 A1 | 7/2018 | Kusens et al. |
| 2018/0357875 A1 | 12/2018 | Kusens |
| 2019/0006046 A1 | 1/2019 | Kusens et al. |
| 2019/0029528 A1 | 1/2019 | Tzvieli et al. |
| 2019/0043192 A1 | 2/2019 | Kusens et al. |
| 2019/0057592 A1 | 2/2019 | Kusens |
| 2019/0122028 A1 | 4/2019 | Kusens et al. |
| 2019/0205630 A1 | 7/2019 | Kusens |
| 2019/0206218 A1 | 7/2019 | Kusens et al. |
| 2019/0253668 A1 | 8/2019 | Kusens |

OTHER PUBLICATIONS

Conaire et al., "Fusion Of Infrared and Visible Spectrum Video for Indoor Surveillance", WIAMIS, Apr. 2005, 4 pages.

Corrected Notice of Allowance received for U.S. Appl. No. 15/279,054, dated Jan. 18, 2018, 2 pages.

Final Office Action received for U.S. Appl. No. 15/134,189, dated Jul. 12, 2018, 23 pages.

Final Office Action received for U.S. Appl. No. 14/757,593, dated Feb. 16, 2018, 8 pages.

Final Office Action received for U.S. Appl. No. 15/395,243, dated Jun. 11, 2019, 18 pages.

First Action Interview Office Action received for U.S. Appl. No. 14/244,160, dated Nov. 28, 2017, 5 pages.

First Action Interview Office Action received for U.S. Appl. No. 15/134,189, dated Feb. 22, 2018, 1 pages.

Kusens, Neil, U.S. Appl. No. 14/613,866, filed Feb. 4, 2015, titled "Method and System for Determining Whether an Individual Takes Appropriate Measures to Prevent the Spread of Healthcare Associated Infections Along With Centralized Monitoring".

Kusens, Neil, U.S. Appl. No. 14/575,850, filed Dec. 18, 2014, titled "Method and Process for Determining Whether an Individual Suffers a Fall Requiring Assistance".

Kusens, Neil, U.S. Appl. No. 14/599,498, filed Jan. 17, 2015, titled "Method and System for Determining Whether an Individual Takes Appropriate Measures to Prevent the D Spread of Healthcare Associated Infections".

Kusens, Neil, U.S. Appl. No. 14/611,363, filed Feb. 2, 2015, titled "Method and System for Determining Whether an Individual Takes Appropriate Measures to Prevent the Spread of Healthcare Associated Infections".

Kusens, Neil, U.S. Appl. No. 14/724,969, filed May 29, 2015, titled "Method and Process for Determining Whether An Individual Suffers a Fall Requiring Assistance".

(56) References Cited

OTHER PUBLICATIONS

Kusens, Neil, U.S. Appl. No. 14/727,434, filed Jun. 1, 2015, titled "Method for Determining Whether Enters a Prescribed Virtual Zone Using Skeletal Tracking and 3D Blob Detection".
Kusens, Neil, U.S. Appl. No. 14/743,447, filed Jun. 18, 2015, titled "System for Determining Whether An Individual Suffers a Fall Requiring Assistance".
Kusens, Neil, U.S. Appl. No. 14/743,499, filed Jun. 18, 2015, titled "System for Determining Whether An Individual Suffers a Fall Requiring Assistance".
Mooney, Tom, Rhode Island ER First To Test Google Glass on Medical Conditions, retrived from <https://www.ems1.com/ems-products/technology/articles/1860487-Rhode-Island-ER-first-to-test-Google-Glass-on-medical-conditions/>, Mar. 11, 2014, 3 pages.
Non-Final Office Action received for U.S. Appl. No. 14/599,498, dated Feb. 22, 2018, 24 pages.
Non-Final Office Action received for U.S. Appl. No. 15/148,151, dated May 8, 2018, 5 pages.
Non-Final Office Action received for U.S. Appl. No. 15/628,318, dated Jun. 8, 2018, 9 pages.
Non-Final Office Action received for U.S. Appl. No. 15/728,110, dated May 2, 2018, 8 pages.
Non-Final Office Action received for U.S. Appl. No. 14/611,363, dated May 7, 2018, 6 pages.
Non-Final Office Action received for U.S. Appl. No. 15/134,189, dated May 9, 2019, 30 pages.
Non-Final Office Action received for U.S. Appl. No. 15/395,762, dated May 1, 2019, 27 pages.
Non-Final Office Action received for U.S. Appl. No. 15/856,419, dated May 2, 2019, 8 pages.
Non Final Office Action received for U.S. Appl. No. 15/395,243, dated Feb. 14, 2019, 14 pages.
Non Final Office Action received for U.S. Appl. No. 16/107,567, dated Mar. 29, 2019, 8 pages.
Non-Final Office Action received for U.S. Appl. No. 15/395,762, dated May 31, 2018, 24 pages.
Notice of Allowance received for U.S. Appl. No. 14/575,850, dated Jun. 13, 2018, 5 pages.
Notice of Allowance received for U.S. Appl. No. 14/757,593, dated Jun. 4, 2018, 5 pages.
Notice of Allowance received for U.S. Appl. No. 15/279,054, dated Nov. 27, 2017, 2 pages.
Notice of Allowance received for U.S. Appl. No. 15/395,716, dated Jun. 19, 2018, 2 pages.
Notice of Allowance received for U.S. Appl. No. 15/395,716, dated May 9, 2018, 5 pages.
Notice of Allowance received for U.S. Appl. No. 15/728,110, dated Jul. 23, 2018, 15 pages.
Pre-Interview First Office action received for U.S. Appl. No. 15/857,696, dated May 23, 2019, 14 pages.
Pre-Interview First Office Action received for U.S. Appl. No. 15/910,645, dated May 21, 2018, 14 pages.
Raheja, et al., Human Facial Expression Detection From Detected in Captured Image Using Back Propagation Neural Network, International Journal of Computer Science and Information Technology (IJCSIT), vol. 2, No. 1, Feb. 2010, 7 pages.
Virtual Patient Observation: Centralize Monitoring of High-Risk Patients with Video- Cisco Video Surveillance Manager, Retrived from: <https://www.cisco.com/c/en/us/products/collateral/physical-security/video-surveillance-manager/whitepaper_11-715263.pdf>, 2013, pp. 1-6.
"Notice of Allowance received for U.S. Appl. No. 15/395,526, dated Sep. 21, 2017", , 13 pages.
"Notice of Allowance received for U.S. Appl. No. 15/395,716, dated Apr. 19, 2017", , 5 pages.
"Notice of Allowance received for U.S. Appl. No. 15/395,716, dated Dec. 6, 2017", , 5 pages.
"Notice of Allowance received for U.S. Appl. No. 15/396,263, dated Jul. 13, 2018", , 9 pages.
"Notice of Allowance received for U.S. Appl. No. 15/728,110, dated Sep. 21, 2018", , 2 pages.
"Pre-interview First Office Action received for U.S. Appl. No. 15/134,189, dated Nov. 22, 2017", , 5 pages.
"Pre-interview First Office Action received for U.S. Appl. No. 15/395,716, dated Feb. 24, 2017", , 5 pages.
"Virtual Patient Observation: Centralize Monitoring of High-Risk Patients with Video- Cisco Video Surveillance Manager", Retrived from <https://www.cisco.com/c/en/us/products/collateral/physical-security/video-surveillance-manager/white paper_11-715263.pdf>,.

* cited by examiner

710 — ▦ - Virtual Blob Detection Zone(s)
720 — △ - Seizure Detection Zone
730 — ▤ ▾ - Saved Zones
740 — □ - Clear All

700

SEIZURE DETECTION

CROSS-REFERENCE TO RELATED APPLICATIONS

This application is a continuation of and claims priority to U.S. Nonprovisional application Ser. No. 16/158,729, filed Oct. 12, 2018, which is a continuation of and claims priority to U.S. Nonprovisional application Ser. No. 15/396,263, filed Dec. 30, 2016, both of which are incorporated by reference in their entireties.

TECHNICAL FIELD

The present disclosure relates to systems, methods and media for detecting seizures.

BACKGROUND

Someone experiencing a seizure may be unable to call for help. During the seizure, the person having a seizure may lose voluntary muscle control and be unable to call for assistance. Immediately following the seizure, the person having the seizure may be exhausted, unconscious, or disoriented, and unable to call for help or to explain what kind of help is needed.

Two common types of seizures are tonic and clonic. During a tonic seizure, the muscles may tense involuntarily. If a person is standing when a tonic seizure begins, that person may fall over. During a clonic seizure, the muscles may spasm violently, causing rapid, jerking motion that can cause serious injury, such as, for example, injuries from striking nearby objects or injuries to the tongue or soft tissues of the mouth from the teeth. Some seizures may exhibit both kinds of involuntary muscle activity, usually as a tonic phase followed by a clonic phase. Assistance for someone experiencing a seizure is usually focused not on stopping the seizure, but on trying to prevent injuries during the seizure.

BRIEF SUMMARY

This brief summary is provided as a general overview of the more detailed disclosure which follows. It is not intended to identify key or essential elements of the disclosure, or to define the claim terms in isolation from the remainder of the disclosure, including the drawings.

The present disclosure generally relates to methods, systems, and media for detecting seizure symptoms.

In some aspects, this disclosure relates to a method for detecting seizure symptoms. The method may comprise receiving, from a 3D motion sensor, two or more images of a person taken at different time points. The method may comprise identifying the person in the two or more images. The method may comprise analyzing data from a detection zone. The method may comprise determining a rate and duration of movement for at least a portion of the person in the images. The detection zone may move with the person if the person moves. Determining whether and/or how (or where) to move the detection zone may be based on tracking a wireless transmitter, facial recognition, voice recognition, skeletal recognition, blob recognition, biometrics, or combinations thereof. The method may comprise determining whether the rate and duration of movement is consistent with a seizure. The method may comprise determining that the rate and duration of movement is consistent with a seizure if one or both of the rate and duration of movement exceeds a predefined threshold.

The method may comprise alerting the person or a designated recipient if the rate and duration of movement is consistent with a seizure. The method may comprise monitoring whether the rate and duration of movement changes after alerting the person. The method may comprise alerting a designated recipient if, after alerting the person, the person does not provide a response recognized as reassuring. The designated recipient may be a caregiver or a central monitoring system. If the designated recipient is a central monitoring system, alerting the central monitoring system may cause a display of the images of the person to move from a primary monitoring display to an alert monitoring display. Identifying the person in the images may comprise blob analysis, skeleton analysis, or both. Determining the rate and duration of movement may comprise assessing a change in position over time of one or more reference points on a blob or skeleton model.

In some aspects, this disclosure relates to a system for detecting seizures. The system may comprise one or more 3D motion sensors located to provide the one or more 3D motion sensors with a view of a person to be monitored, the 3D motion sensors configured to collect a series of images of the person. The system may comprise a computerized monitoring system communicatively coupled to the one or more 3D motion sensors. The computerized monitoring system may be configured to identify one or more reference points on the person's body. The computerized monitoring system may be configured to determine the rate and duration of movement for one or more monitored reference points between two or more images in the series of images. The computerized monitoring system may be configured to determine whether the rate and duration of movement is consistent with a seizure. The system may comprise a computerized communication system communicatively coupled to the computerized monitoring system. The computerized communication system may be configured to send an alert to one or more designated recipients if it is determined that the rate and duration of movement is consistent with a seizure.

The system may comprise a central monitoring system communicatively coupled to the computerized communication system. The central monitoring system may be configured to display at least a portion of the series of images of the person. The central monitoring system may comprise a primary display and an alert display. The alert display may be a dedicated portion of the primary display. The alert display may be a display or series of displays separate from the primary display. If the computerized monitoring system determines the rate and duration of movement is consistent with a seizure, the computerized communication system may send an alert to the central monitoring system. On receiving an alert, the central monitoring system may move a display of at least a portion of the series of images of the person from the primary display to the alert display. The computerized communication system may be configured to send a message to the person being monitored. The computerized communication system may be communicatively coupled to a public announcement system, intercom system, speaker, telephone, mobile phone, personal computing device, pager, alarm, or combination thereof near the person being monitored. The system may comprise a database. The database may be communicatively coupled to at least one of the computerized communication system and the central monitoring system.

Additional objects, advantages, and novel features of the disclosure will be set forth in part in the description that follows and, in part, will become apparent to those skilled in the art upon examination of the following, or may be learned by practice of the disclosure.

BRIEF DESCRIPTION OF THE SEVERAL VIEWS OF THE DRAWING

The disclosure includes the attached drawing figures, wherein.

DETAILED DESCRIPTION

The subject matter of the present disclosure is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Seizures may have durations as short as 10 seconds, and, except when a seizure is prolonged, seizures are not usually treated with the goal of stopping a seizure already in progress. Shorter seizures may be so brief that it is not feasible to provide any immediate aid during the seizure. By the time the seizure is recognized, it may be over or nearly over. However, even after a brief seizure, a person suffering from a seizure may be frightened, disoriented, semi-conscious or unconscious. Even if a person who has just emerged from a seizure is conscious, he or she may have limited or no memory of the event, or may be injured or disoriented and unable to call for help, to speak clearly, or to understand what happened and what kind of help might be wanted or needed.

Identifying a seizure can be important for diagnosis and treatment to prevent future seizures. First aid may be required for injuries incurred during the seizure, as from falling, self-biting, or striking objects during involuntary movements. During a seizure, a person may lose control of excretory functions, and may require assistance bathing or cleaning up after the seizure. Even if the person is physically well and clean after the seizure, the person may desire comfort, reassurance, or just not to be alone following a seizure. Embodiments of this disclosure may identify a possible seizure even when there is no one else with the person having the seizure when it occurs. Embodiments of this disclosure may facilitate the provision of assistance following a seizure without requiring the person who had the seizure to call for help or articulate what kind of help is needed. Embodiments of this disclosure may identify and/or record patterns of seizures that may be helpful for diagnosis, particularly, but not exclusively, if the person having the seizure does not have a clear recollection of what happened just before, during, or just after the seizure.

Figure 1:
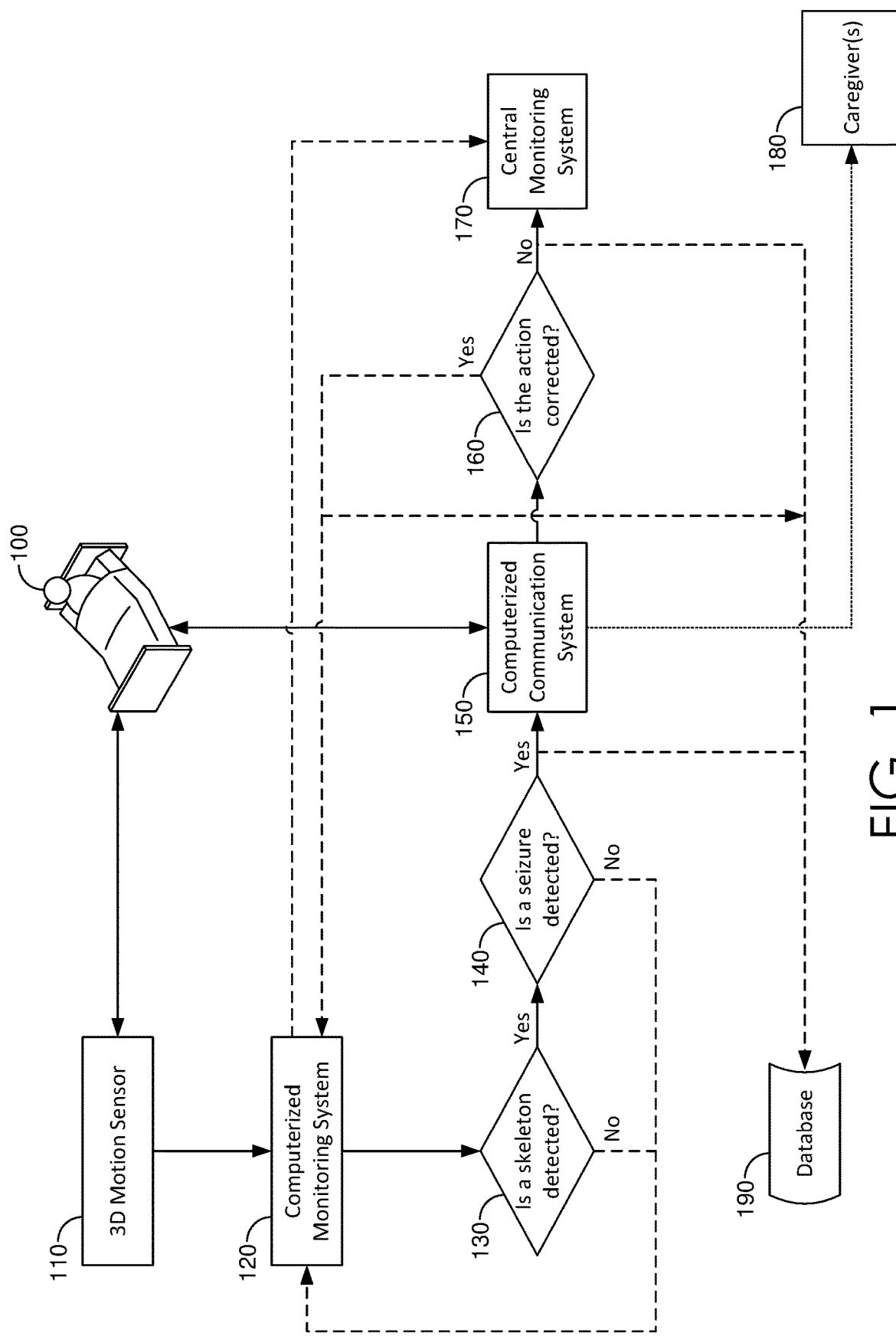
FIG. 1 is a flowchart for an exemplary method and system for detecting a seizure in accordance with aspects of this disclosure.
Figure 2:
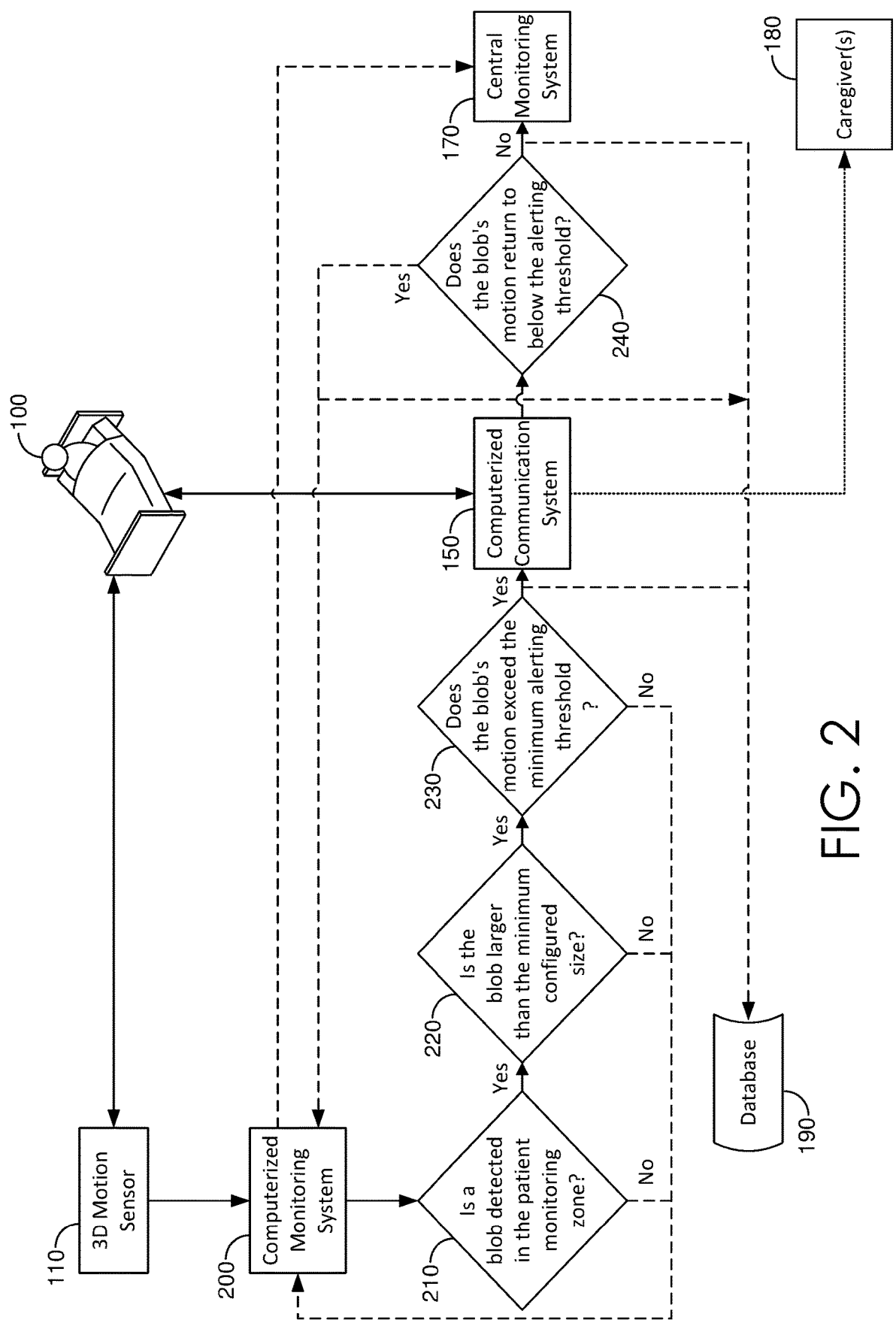
FIG. 2 is a flowchart for an exemplary alternative method and system for detecting a seizure in accordance with aspects of this disclosure.

As shown in FIGS. 1 and 2, a person 100 may be monitored for seizure symptoms. The person 100 to be monitored may be monitored in a variety of environments, including, without limitation, a hospital, a home, a hospice care facility, a nursing home, an assisted living facility, an outpatient medical care facility, and the like. The person may be a patient under the immediate medical care of a medical professional, or may be a person with or without a medical diagnosis related to seizures (such as epilepsy) who is concerned about possible seizures. The person may have one or more caregivers. A caregiver may be a medical professional or paraprofessional, such as an orderly, nurse's aide, nurse, or the like. A caregiver may also be a friend, relative, individual, company, or facility that provides assistance with daily living activities and/or medical care for individuals, such as individuals who are disabled, ill, injured, elderly, or otherwise in need of temporary or long-term assistance. In some instances, the person to be monitored may be self-sufficient and not under the immediate care of any other person or service provider.

Person 100 may spend a significant portion of time in a particular location, such as a bed, chair, workstation, or the like. A 3D motion sensor 110 may be positioned where it is likely to collect images of person 100. The 3D motion sensor 110 may be moveable and/or repositionable, e.g., from building to building or between locations within a home or room, or different 3D motion sensors 110 may be placed in a variety of locations where person 100 spends time. A 3D motion sensor is an electronic device that contains one or more cameras capable of identifying individual objects, people and motion. The 3D motion sensor may further contain one or more microphones to detect audio. The cameras can utilize technologies including but not limited to color RGB, complementary metal-oxide-semiconductor (CMOS) sensors, lasers, infrared projectors and RF-modulated light. The 3D motion sensor may have one or more integrated microprocessors and/or image sensors to detect and process information both transmitted from and received by the various cameras. Exemplary 3D motion sensors include the Microsoft® Kinect® Camera, the Sony® PlayStation® Camera, and the Intel® RealSense™ Camera, each of which happens to include microphones, although sound capture is not essential to the practice of the disclosure.

As used herein, "a sensor" and "sensors" are used interchangeably in the singular and plural unless expressly described as a singular sensor or an array of sensors. A singular sensor may be used, or two or more sensors may be integrated into a single physical unit. Alternately, two or more physically distinct sensors may be used, or two or more physically distinct arrays of sensors may be used.

As used herein, "identifying a person" refers to distinguishing a human body from other objects or bodies within an image frame. Facial recognition or other biometric measurements, transceivers, or other technologies could be used to uniquely identify an individual, e.g., by name or other patient identifier. However, the methods described herein may be practiced without uniquely identifying the person being monitored.

The 3D motion sensor 110 may communicate data, such as images of the person 100 being monitored, to a computerized monitoring system, shown as computerized monitoring system 120 in FIG. 1. The computerized monitoring system 120 is a computer programmed to monitor transmissions of data from the 3D motion sensor 110. The computerized monitoring system 120 may be integral to the 3D motion sensor 110 or a distinctly separate apparatus from the 3D motion sensor 110, possibly in a remote location from 3D motion sensor 110 provided that the computerized monitoring system 120 can receive data from the 3D motion sensor 110. The computerized monitoring system 120 may be located in the monitored person's room, such as a hospital room, bedroom, or living room. The computerized monitoring system 120 may comprise or be connected to a computerized communication system 150. The computerized monitoring system 120 may be connected to a central monitoring system 170. The computerized monitoring system 120 and central monitoring system 170 may be remotely located at any physical locations so long as a data connection exists (USB, TCP/IP or comparable) between the computerized monitoring system 120, the computerized communication system 150 (if separate from computerized monitoring system 120), the central monitoring system 170, and the 3D motion sensor(s) 110.

The computerized monitoring system 120 may receive data from 3D motion sensor 110. The data may include images of a monitoring zone, such as detection zone 800 of FIG. 8. At step 130, the computerized monitoring system 120 analyzes the data from 3D motion sensor 110 to determine whether a skeleton-like figure (e.g., a person) is present in the monitoring zone. If no skeleton is detected, computerized monitoring system 120 may periodically re-assess whether a skeleton-like figure is present. If a skeleton is detected, at step 130 computerized monitoring system compares two or more images received from the 3D motion sensor 110 over time. If motion is observed, the computerized monitoring system determines the rate and duration of movement. A rate of movement above a predefined threshold and/or repetitive back-and-forth or "jerking" motions may be symptomatic of a seizure. The rate of movement may be assessed, for example, by tracking the position of a representative location on the person's body over time. A representative location or reference point may be selected from a point tracked using skeleton or blob modeling, or may be identified for the purpose of detecting possible seizures.

Suitable locations for skeletal tracking include, but are not limited to, points on the forehead, brow, nose, cheekbones, or jawbone. These and/or other locations may be monitored depending on the kind of seizure of interest. For example, some people predominantly move their arms or their legs during a seizure. For patients with a known or suspected susceptibility to a particular type of seizure or particular seizure symptoms, monitored locations on the body may be selected to correspond to the expected seizure-related motion. For patients with a heightened seizure risk but no particular history (or no memory of how prior possible seizures were personally manifested), multiple locations, possibly on different body parts like the head, shoulder, legs and/or arms, could be monitored. For example, for a patient known or suspected to kick during a seizure, locations to be monitored may focus on leg segments, such as hips, thighs, knees, lower legs, ankles, and/or feet.

Computerized monitoring system 120 determines whether the movement is consistent with a seizure by comparing the determined rate and/or duration of movement to a predefined threshold. For example, computerized monitoring system 120 may look for movement above a predefined velocity for a sustained period, such as 10 seconds. In addition to or instead of evaluating image data for movement above a predefined velocity, computerized monitoring system 120 may evaluate image data for variability in velocity and/or duration of movement. As with velocity, the variability may be subject to a predefined threshold and/or duration, as to distinguish someone kicking off a blanket from someone experiencing, for example, a clonic seizure or clonic phase of a seizure. Blob detection may use similar velocity and/or duration thresholds to determine that the movement is consistent with a seizure. Blob detection may look at overall movement of the blob, without isolating specific body parts from the overall blob. Alternately, blob detection may look for "sub-blobs," such as head, arms, legs, etc., and use those or even more granular distinctions to monitor movement of particular body parts. If no symptomatic movement is detected, computerized monitoring system 120 continues to monitor the skeleton while a skeleton is present.

Although the figures show a complete skeleton model for the person being monitored, it will be appreciated by one of skill in the art that it is not necessary to track or analyze motion for the entire body of the person being monitored. Analyzing only a portion of the images available from the 3D motion sensor 110 (e.g., corresponding to a portion of the person's body) may reduce the bandwidth required for communicating data between system components, and reduces the processing capacity required for analyzing the image data. A seizure detection zone 1110 may be used to define a portion of the images to be analyzed, as described below.

If movement symptomatic of a seizure is detected, computerized monitoring system 120 notifies computerized communication system 150. Computerized communication system 150 may be a program or module of computerized monitoring system 120, or may be a physically distinct, and possibly physically remote, apparatus. Computerized communication system 150 is communicatively coupled to both computerized monitoring system 120 and central monitoring system 170. Computerized communication system 150 may further be, or comprise, or be communicatively coupled to an alert system near the person 100 being monitored. The system may be near the person in that audio, visual, tactile, or any other kind of alert would be reasonably perceptible to the person 100 being monitored. For example, the communication device may be in the same room as the person, or visible from a bed, chair, or other item of furniture in the room, or may be within arm's reach of the person, depending on the kind of communication device used in the alert system and, possibly, the abilities or impairments of the person.

On receiving notification that the computerized monitoring system 120 has detected a seizure (or movement consistent with a seizure), computerized communication system 150 may notify the person 100 being monitored. Exemplary notifications could be delivered via speakers; an intercom system; a television; a radio; a computer, including desktops, laptops, and tablet computers; a telephone; a mobile device, such as a cellular phone, a pager, or a dedicated alarm; these or other personal computing devices; a display panel, such as a liquid-crystal display (LCD) screen; a visual signal, such as flashing or colored lights; or combinations thereof. The notification may include language or otherwise be designed to solicit a response from the person 100 being monitored. For example, an audible or visual notification might send a message to the person 100, for example, an inquiry like "Are you ok?"

Data from 3D motion sensor 110 and/or other apparatus near the person 100 being monitored may be used to assess the response to the notification provided to the person 100 by computerized communication system 150. For example, data from 3D motion sensor 110 may indicate that person 100 gave a "thumbs-up" sign in response to the notification. As another example, if 3D motion sensor 110 includes a sound sensor, the 3D motion sensor 110 or another device may be used to transmit an audible response from the person 100, perhaps something like, "yes, I am OK." Nodding could be used as an affirmative response that the person 100 is not having a seizure, perhaps with on-going monitoring of other body parts to insure that the nodding is a response to the notification and not an involuntary movement. The computerized communication system 150 may comprise or have access to a processor (e.g., the processor of the computerized monitoring system or a processor associated with 3D motion sensor 110) to execute speech recognition algorithms to determine whether the response to the notification is reassuring. Alternately, the computerized communication system 150 may receive any response from person 100 (e.g., via telephone, 3D motion sensor 110, microphones or an intercom near person 100, etc.), and transmit the response to the central monitoring system 170 for further analysis.

If computerized communication system 150 receives and recognizes a reassuring response from the person 100 being monitored, control is returned to computerized monitoring system 120. If computerized communication system 150 receives and recognizes a response that is not reassuring or is a request for assistance (e.g., a statement from person 100 like "Ouch!" or "Help!"), if no response is received from person 100, or a response is received that cannot be categorized (e.g., unintelligible words, nodding with ambiguous other body movements, etc.), computerized communication system 150 is configured to send an alert to one or more designated recipients.

Central monitoring system 170 may be alerted if no response is received at step 160, or if the response is unintelligible or indicates that the person 100 being monitored wants or needs assistance. Alternately, or additionally, central monitoring system 170 may be alerted with or even before person 100, so that central monitoring system 170 can determine whether the apparent seizure detected is, in fact, problematic. On receiving an alert, the central monitoring system 170, or an attendant there, may view live image, video and/or audio feed from the 3D motion sensor 110, and evaluate whether it appears that assistance is needed. The image data that triggered the alert may be stored, as in database 190. If so, central monitoring system 170 can access and consider the image data that triggered the alert as well as a live image, video, and/or audio feed. Video may comprise a series of images captured and/or displayed at a rate of at least 30 frames per second. However, the system can operate using a frame rate at least as low as 1 frame per second, or between 1 and 30 frames per second. Accuracy of tracking and detection may improve at higher frame rates.

If person 100 has been alerted by the computerized communication system 150, central monitoring system 170 or an attendant there can use the data from 3D motion sensor 110 and/or other communication devices to evaluate whether a response from person 100 is reassuring or indicates that person 100 requires assistance. Central monitoring system 170 and/or computerized monitoring system 120 may analyze the response from person 100; however, if the response does not include words or gestures recognizable by the computerized system, an attendant at central monitoring system 170 may be able to interpret the person's response. If needed, the central monitoring system 170 and/or the attendant could then approve alert(s) to appropriate caregiver(s) 180 and/or call for emergency assistance (e.g., send a request for emergency medical services to 9-1-1 or a similar service local to the person 100). Designated recipients for an alert may include, for example, the person being monitored, a primary caregiver, a secondary caregiver, a relative, a friend, a roommate, and/or an emergency response service, and may be designated during initial set-up of the system or at any time prior to the alert, as described below.

Data associated with alerts may be logged by computerized monitoring system 120, computerized communication system 150, and/or central monitoring system 170 in a database 190. Data associated with an alert may include, without limitation, the telemetry data from 3D motion sensor 110 that triggered the alert; buffered data preceding the telemetry data that triggered the alert; telemetry data subsequent to the alert; the number and substantive content of an alert; the individual(s) and/or groups to whom an alert was addressed; the response, if any, received or observed following an alert; and combinations thereof.

FIG. 2 shows an alternative flowchart to FIG. 1, using blob detection instead of skeleton tracking. A 3D motion sensor 110 is used to monitor a person 100, as in other embodiments. Image data from the 3D motion sensor is received by computerized monitoring system 200, which may be a separate configuration or operating mode for computerized monitoring system 120 or could be a distinct system. Image data is analyzed to determine whether a blob consistent with a human figure is detected in the patient monitoring zone of the image data, as shown at step 210. If no blob is detected, the computerized monitoring system 200 continues to periodically analyze image data for a blob in the patient monitoring zone. If a blob is detected, at step 220, the computerized monitoring system 200 determines whether the detected blob is between configured minimum and maximum sizes. The configured size may be selected based on the individual person 100 being monitored, or the kind of person 100 being monitored (e.g., an adult or a child), or the surroundings. The configured sized may help to distinguish the person to be monitored from other objects, like trays, canisters, telephones, small devices (such as cell phones or remote controls), as well as larger objects like furniture. Additionally or alternatively, depth ranges may be used to filter out background and/or foreground objects that might otherwise be mistaken by the system for a person or a part of a person. If the blob does not meet the configured size range, control returns to the computerized monitoring system 200, which continues to periodically analyze image data for a blob in the patient monitoring zone.

If the blob meets the minimum configured size, at step 230 computerized monitoring system 200 compares two or more images received from the 3D motion sensor 110 over time. If motion is observed, the computerized monitoring system 200 determines the rate and duration of movement. A high rate of movement and/or repetitive back-and-forth or "jerking" motions may be symptomatic of a seizure. If no symptomatic movement is detected, computerized monitoring system 200 continues to monitor the blob while a blob is present. If movement symptomatic of a seizure is detected, computerized monitoring system 200 notifies computerized communication system 150, with further processing as described for other embodiments.

Figure 3:
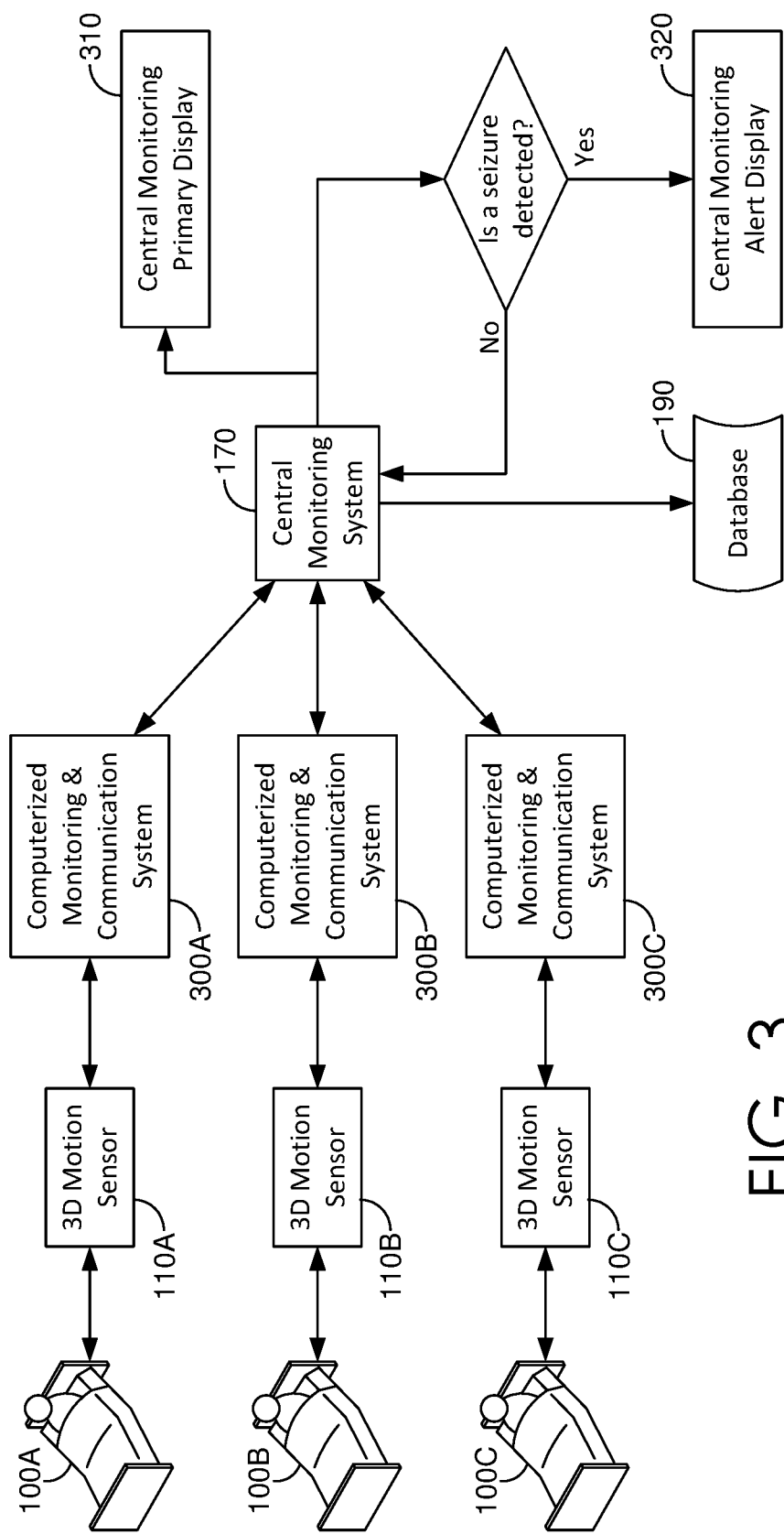
FIG. 3 is a flowchart for an exemplary method and system for central monitoring in accordance with aspects of this disclosure.

FIG. 3 illustrates an exemplary array of multiple 3D motion sensors, 110A, 110B, and 110C, capturing images of persons 100A, 100B, and 100C. As shown, each 3D motion sensor communicates image data to a separate computerized monitoring and communication system, 300A, 300B, and 300C, which may use skeletal tracking or blob detection to analyze the image data. Alternately, one or more of the 3D motion sensors 110A, 110B, and 110C could communicate image data to a shared computerized monitoring and communication system 300A. Similarly, one or more computerized monitoring and communication systems may communicate with a single central monitoring system 170.

Figure 5:
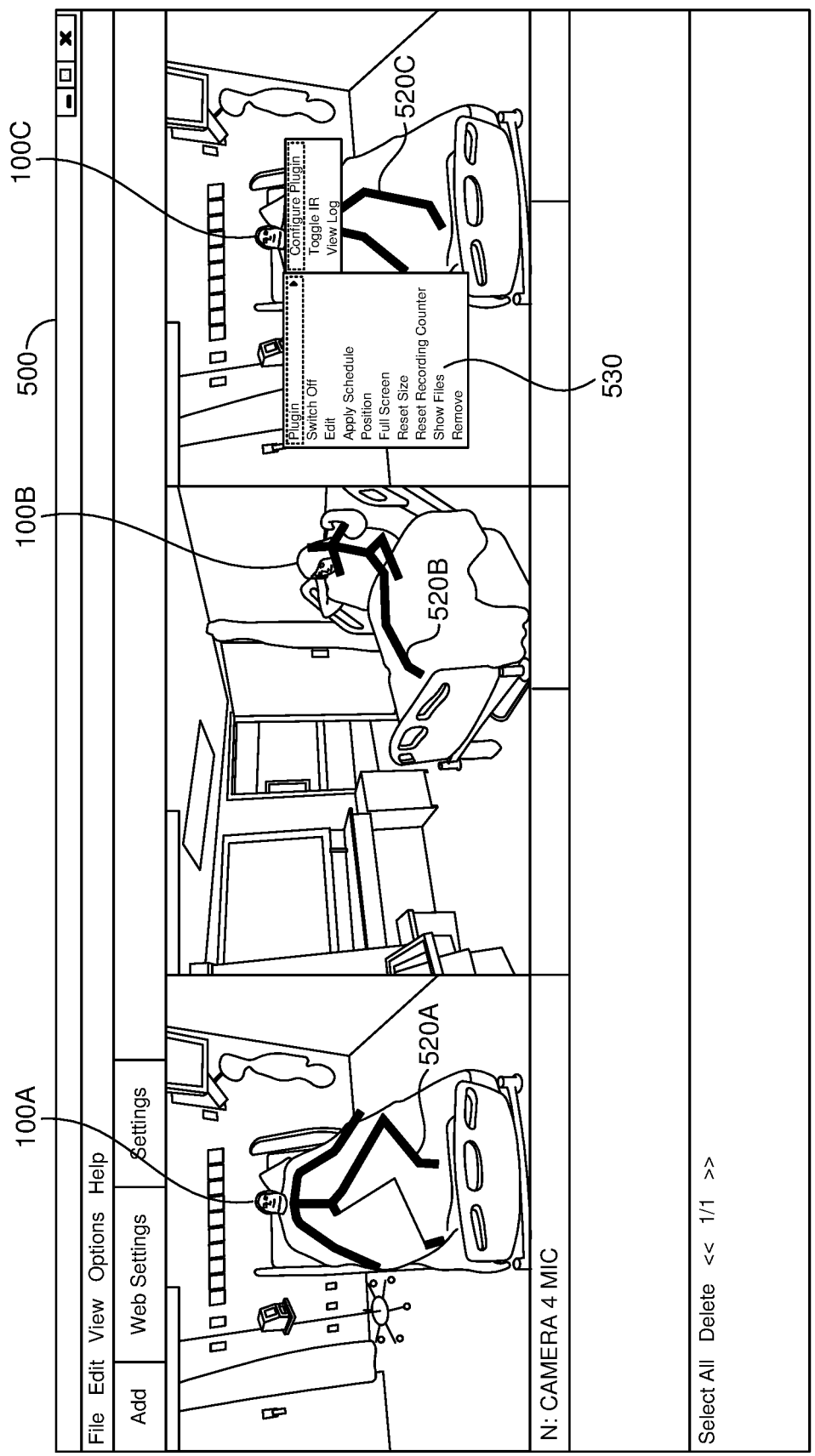
FIG. 5 is an exemplary monitoring view in accordance with aspects of this disclosure.

Central monitoring system 170 may comprise a central monitoring primary display 310. Data received by the central monitoring system 170 from computerized monitoring and communication systems 300A, 300B, and 300C may routinely be displayed on central monitoring primary display 310. A single primary display 310 may display data from more than one computerized monitoring system, shown as view 500 in FIG. 5. Alternately, primary display 310 may comprise two or more distinct screens, each of which may display data from one or more computerized monitoring and communication systems.

When the central monitoring system 170 receives an alert from any of the computerized monitoring and communication systems 300A, 300B, 300C, indicating that a monitored person 100A, 100B, or 100C is presenting seizure symptoms, audio and/or alert information for that particular person may be displayed on the central monitoring alert display 320. An alert can be presented in a variety of formats. An alert may be a visual cue on screen at the central monitoring system 170, such as the specific camera view flashing or being highlighted in a color to draw attention to that display among others. An alert may be an audible sound (e.g., a voice or alarm type sound) at the central monitoring system 170, an audible sound at a computerized monitoring system attached to the 3D motion sensor 110, a text message, an email, turning on or off a light or even running a program on a computer. Should the central monitoring system 170 receive alerts from more than one of the computerized monitoring and communication systems 300A, 300B, 300C, indicating that a person 100A, 100B, and/or 100C is presenting a seizure symptom, the central monitoring alert display 320 may display the video, audio and/or alerting information from all such instances at the same time. If no alert is received by the central monitoring system 170, it may be that nothing is displayed on the central monitoring alert display 320. Preferably, all monitored individual rooms can be displayed and visible on the central monitoring primary display 310 whether alerting or not. When an alert is generated, attention can be drawn to the particular camera on central monitoring primary display 310, for example, by highlighting the alert display or causing the display to move to a dedicated alert portion of the primary display, and/or a duplicative display of the alerting camera can be displayed on a second, separate computer monitor, e.g., the central monitoring alert display 320, or the images associated with the particular camera can be moved or transferred from the central monitoring primary display 310 to the central monitoring alert display 320.

An electronic record of any alerts received, any responses to the alert observed or received, and/or any actions taken by the central monitoring system 170 can be stored in a database 190.

Figure 4:
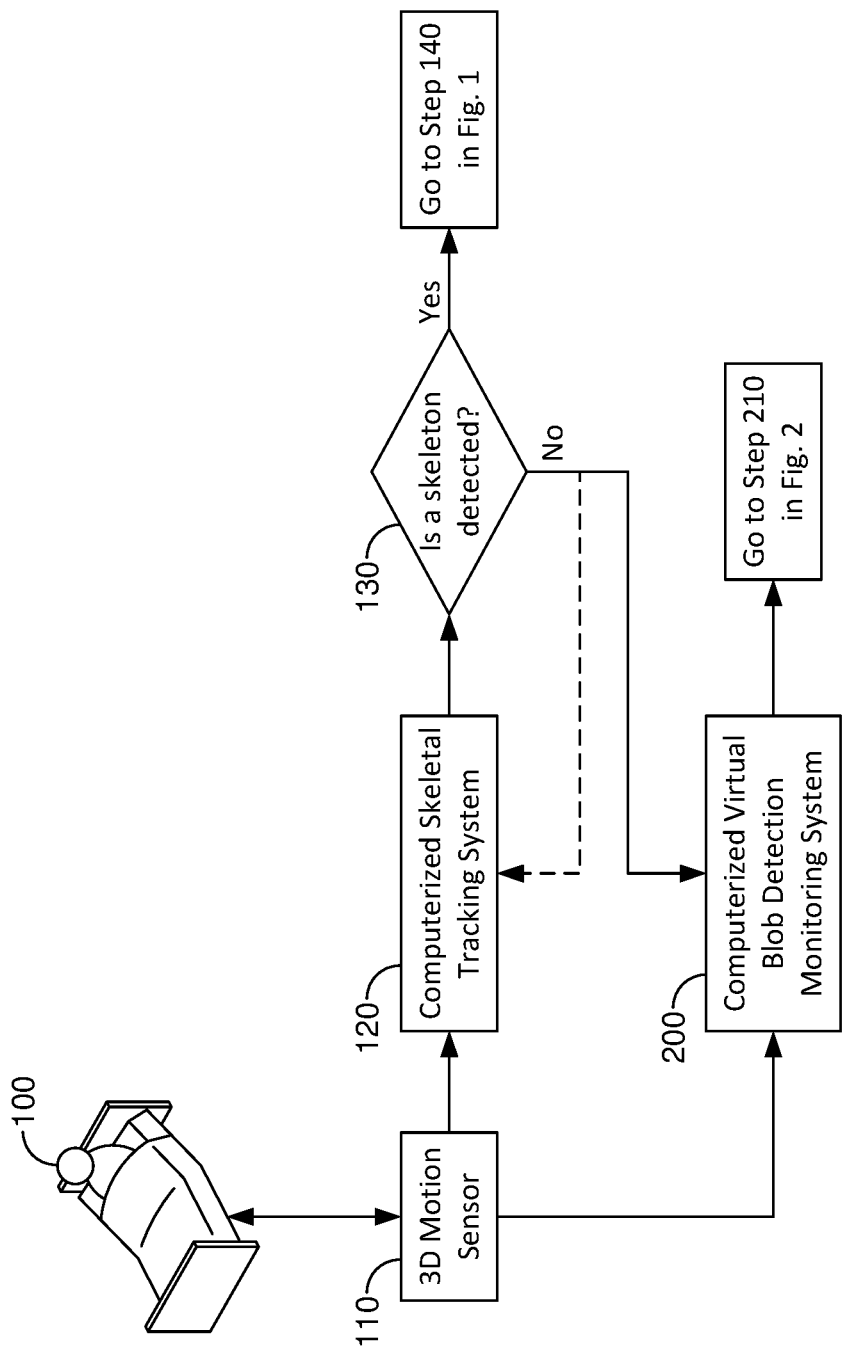
FIG. 4 is a flowchart for an exemplary method and system for determining a monitoring mode in accordance with aspects of this disclosure.

A single computerized monitoring system may use both skeletal tracking and blob tracking, as shown in FIG. 4. A computerized monitoring system 120 receives data from 3D motion sensor 110. The computerized monitoring system 120 determines whether a skeleton is detected, as at step 130. If a skeleton is detected, the process continues to step 140 in FIG. 1. If no skeleton is detected, the computerized monitoring system 120 may pass the data from 3D motion sensor 110 to computerized monitoring system 200. The computerized monitoring system 200 analyzes the data as beginning in step 210 in FIG. 2. Skeleton tracking is favored in this order of data analysis. Alternately, blob detection could be applied first, passing the data from computerized monitoring system 200 to computerized monitoring system 120 if no blob is detected. Still alternately, both skeleton tracking and blob detection could be used simultaneously. The computerized monitoring system 120 and computerized monitoring system 200 may be implemented as separate hardware, or could be different programs, modules, or routines of a shared computerized monitoring system hardware package.

The system may be configured to operate in conjunction with one or more wireless identifiers. The identifiers may use short- or long-wave communication techniques, such as WiFi, Bluetooth®, Radio Frequency ID (RFID), or any other suitable signal which may be detected by a detector associated with or in communication with the system. The identifiers may be visual. For example, the identifiers may include figures, symbols (alpha-numeric or otherwise), bar codes, or other visual identifiers. The system may be configured to detect and/or track the wireless identifier(s). The system may use the wireless identifier(s) to confirm the identity of the person, e.g., before initiating monitoring or before logging patient-specific information to a database or other record. In some instances, the visual identifier may be the person's face, which may be used to uniquely identify a particular person using facial recognition, and/or used to "lock on" to a particular person without necessarily identifying the person using facial tracking.

The system may use the wireless identifier(s) to "lock on" to a particular person in the room with or without uniquely identifying a particular person (e.g., by name, patient number, etc.). The system could then establish a monitoring and/or detection zone around that person that could move with the person within the range of the 3D motion sensors. For example, a monitoring zone configured—automatically or by a human user—around a patient wearing a wireless identifier could then be transposed by the system to maintain a relationship between one or more reference points on the monitoring zone boundary or boundaries (width, height, and/or depth) and one or more reference points on the patient (for example, the top or center of the patient's head). Alternately, for visual or non-visual identifiers, the system may determine the direction of the identifier (and/or identifier's signal) relative to the 3D motion sensor, and use the directional information to move a monitoring zone with the person being monitored. Such wireless identification sub-processes could be used with skeletal tracking, blob tracking, facial tracking, or other tracking methods.

Figure 22:
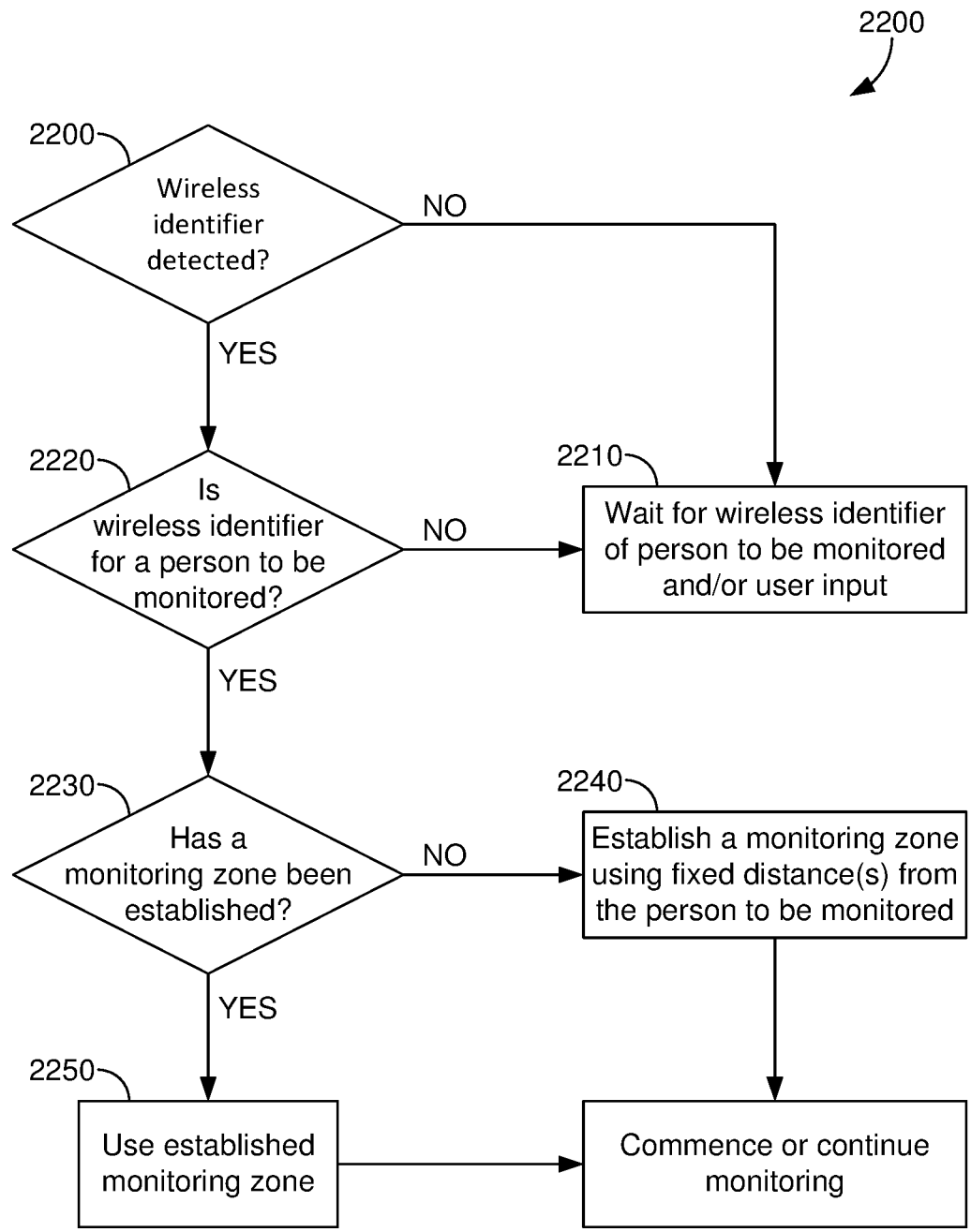
FIG. 22 is an exemplary flowchart for establishing a monitoring zone in accordance with aspects of this disclosure.

As shown in FIG. 22, the system may check for a wireless identifier, shown as 2200. This check may be performed at any time during or prior to monitoring a person or a monitoring zone. For example, this check might be performed before analyzing images for a skeleton in step 130 of FIG. 1 or a blob in step 210 of FIG. 2. The system may check for a wireless identifier periodically during monitoring, to confirm that the same person is being monitored, or may check for a wireless identifier on system reset, such as after a power outage or when the system is first turned on, or prior to sending one or more alerts. If no wireless identifier is detected, the system may continue monitoring, if already in monitoring mode, or may wait for a wireless identifier of a person to be monitored and/or user input, shown as 2210. User input may include, for example, setting up or establishing a monitoring or detection zone, setting up one or more alerts, or otherwise preparing the system for use or instructing the system to begin monitoring.

If a wireless identifier is detected, the system may check to see if the wireless identifier is for a person to be monitored, shown as 2220. In some instances, the system may be able to positively identify the wireless identifier as a person to be monitored. For example, the wireless identifier may communicate a patient number or other indication that the person associated with the wireless identifier is a person to be monitored. Such an indication might be direct. For example, the wireless identifier might be a symbol or text indicating that the person is to be monitored. The indication might be indirect. For example, the wireless identifier might identify a person who is known via a database or other system information to be a person to be monitored. In some instances, the system may infer that anyone who is not ruled out as a person to be monitored is to be monitored. For example, the system may distinguish hospital or facility personnel from all others, and treat all others as a person to be monitored.

If a wireless identifier for a person to be monitored is detected, the system may check to see if a monitoring zone has been established, shown as 2230. If no monitoring zone (and/or detection zone) has been established, the system may automatically establish a monitoring and/or detection zone, for example, by using a fixed volume defined by one or more fixed distances from one or more reference points on the person to be monitored. For example, a single fixed distance about the approximate center of the forehead of the person to be monitored might be used as the radius for a monitoring zone in the shape of a sphere about the person. Alternately, multiple distances could be used to establish a monitoring zone generally having a cross-section in the shape of an ellipse, a rectangle, a triangle, a square, a or any other desired shape. If desired, longer distances may be used to automatically establish a monitoring zone, with a detection zone being automatically established with somewhat shorter distances and/or possibly a different 3D shape. Using the automatically established monitoring zone or a previously established monitoring zone (identified as 2250), the system may commence or continue monitoring the person. Monitoring may be checked and continued, for example, if the system has lost power or data connectivity during a monitoring session, or if the person being monitored leaves the monitoring zone, or a check for a wireless identifier may be conducted periodically to insure the person being monitored has not changed (e.g., with the discharge of a prior patient and admission of a new patient to the same room) or the person being monitored has not taken up a new location in the room where the monitoring is occurring (e.g., moving from a chair to a bed).

As mentioned above, FIG. 5 presents view 500, as might be seen on the central monitoring primary display 310, including images of persons 100A, 100B, and 100C being monitored. As shown, a single screen presents multiple sub-views, or images of multiple patients. In other embodiments, two or more screens could each present images of one or more monitored persons. Each person 100A, 100B, 100C is shown with a skeleton overlay 520A, 520B, and 520C, respectively. Alternately, each person 100A, 100B, 100C could be shown with a blob overlay, if blob detection analysis is employed instead of skeleton analysis. Landmark tracking or facial tracking could also be used, and these or other tracking features may be shown as depicted, or not, at the preference of the system user. A configuration menu 530 is shown in the view for person 100C. The view for a particular person, such as person 100C, can be selected and enlarged, as, for example, for monitoring at higher resolution or for configuring a particular view. A single image view 600 is shown is in FIG. 6, providing a more detailed view of person 100C. Skeletal FIG. 520C or alternate tracking scheme may also be visible, if desired.

Figures 6, 7:
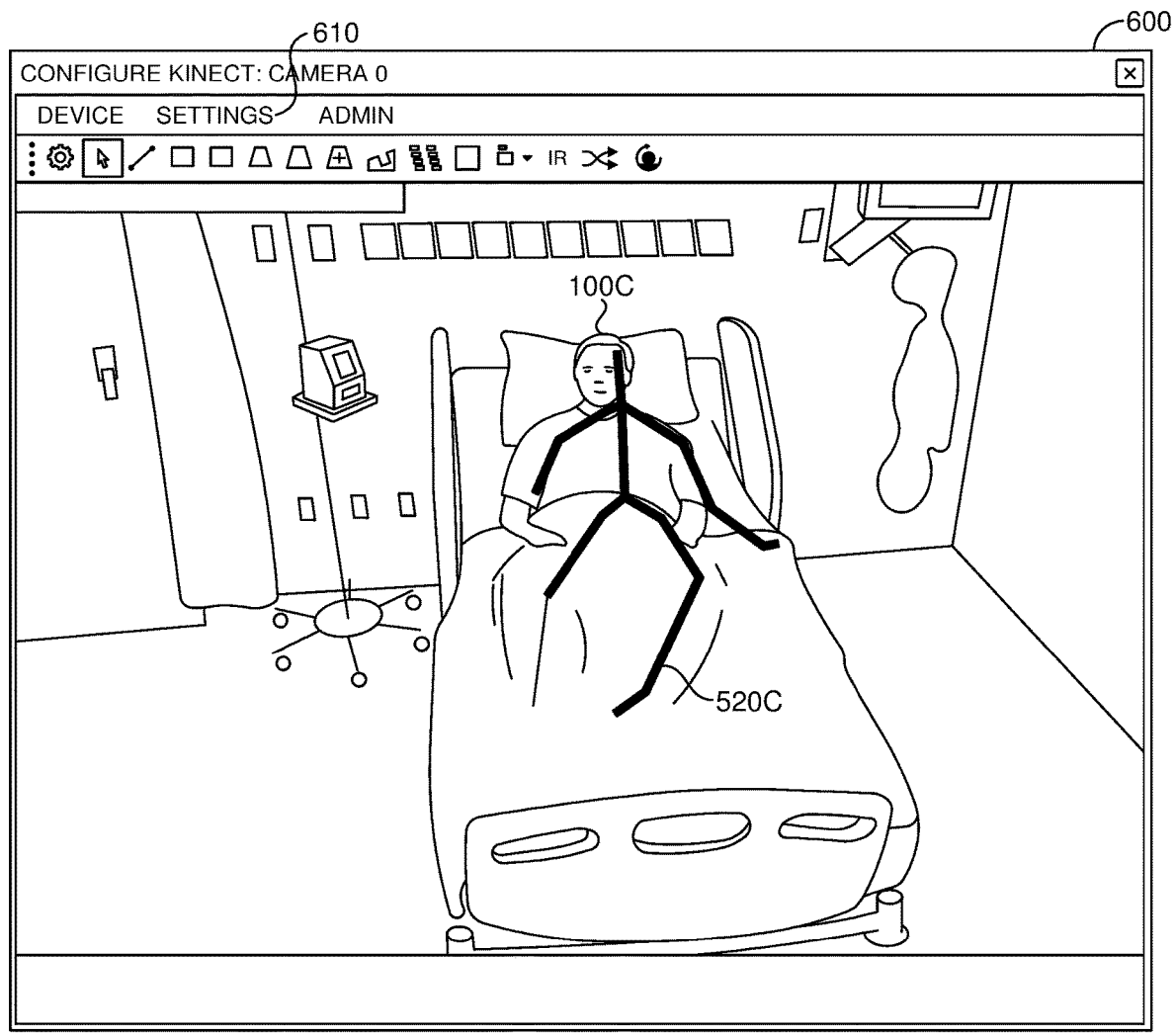
FIG. 6 is an exemplary monitoring view in accordance with aspects of this disclosure.
FIG. 7 is an exemplary configuration menu in accordance with aspects of this disclosure.

FIG. 7 shows an exemplary configuration menu 700. The exemplary configuration menu 700 includes an option for setting up or modifying a virtual blob detection zone 710, which might, alternately, define a zone for detecting a skeleton figure, body landmarks, facial features, etc. The exemplary configuration menu 700 includes an option 720 for setting up or modifying a seizure detection zone. The exemplary configuration menu 700 includes an option 730 for reviewing or selecting saved zones. The exemplary configuration menu 700 includes an option 740 to clear all previously set zones. These menu options and their descriptors are exemplary, and more, fewer, or different menu options could be presented. The configuration menu 700 might be made available on selecting from a drop down list, as by selecting the Settings menu 610 (shown in FIG. 6), or by hovering a pointing device over the image of the person of interest in view 500, or by clicking or right-clicking on the image of the person of interest in view 500 or view 600.

Figure 8:
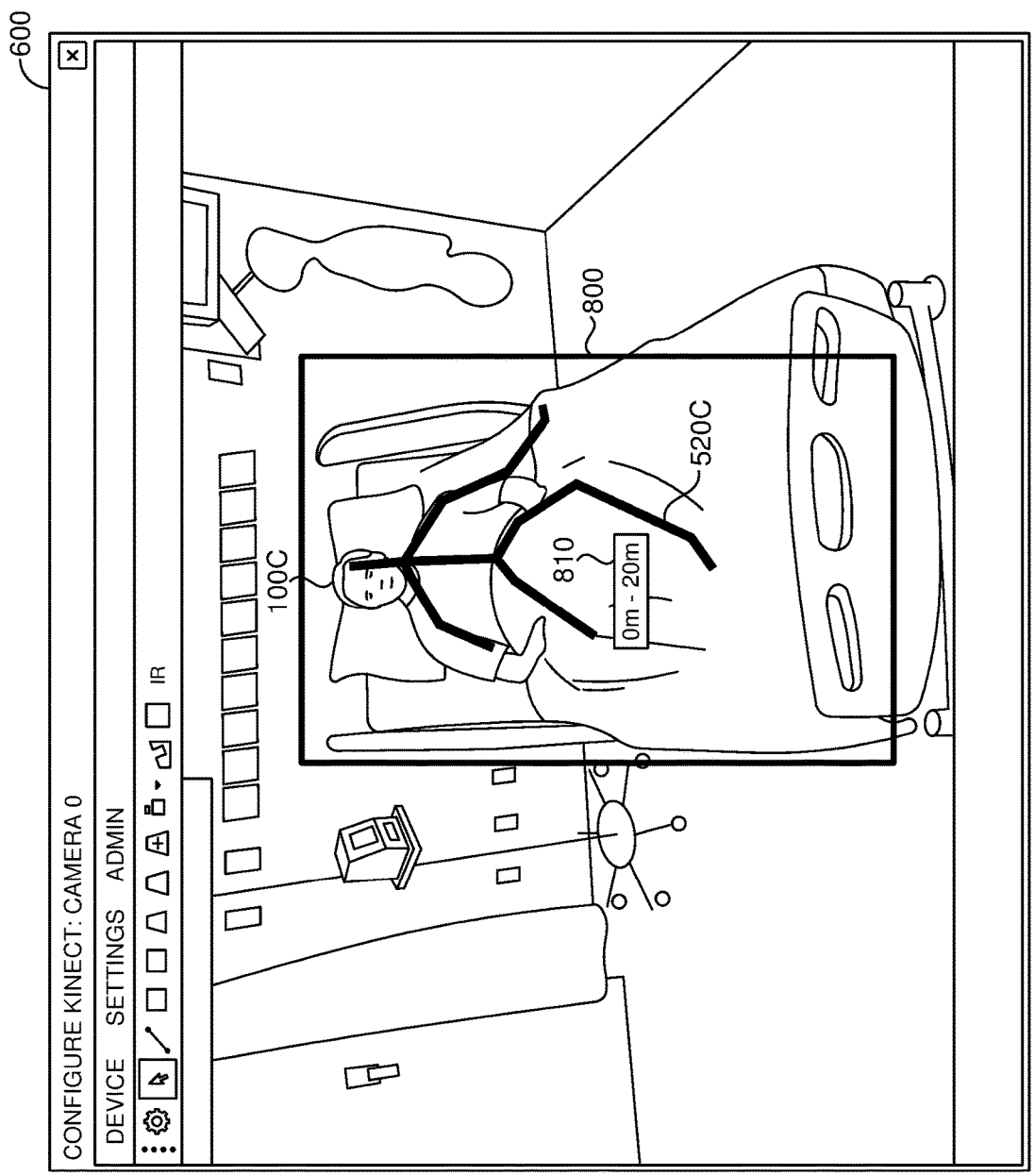
FIG. 8 is an exemplary configuration view in accordance with aspects of this disclosure.

FIG. 8 shows view 600 after selection of a menu option for configuring a blob or skeleton detection zone for person 100C. The detection zone 800 may be automatically generated for user review. For example, the system may identify a skeleton (or blob, body landmark, facial landmark, etc.) and draw a zone a certain distance from the center or edges of the skeleton or other feature of interest. Alternately or additionally, the system may provide the user with tools, such as drag-and-drop or pull-to-expand boxes that the user can place over the image of person 100C to define the detection zone 800. If desired, a user may be permitted to draw free-hand a boundary defining the detection zone 800. As shown, the detection zone 800 is rectangular, but any alternative desired shape could be used, including, without limitation, squares, circles, ovals, or other regular or irregular shapes. As shown, detection zone 800 is defined around a single person 100C in view 600, however, in some embodiments, the initial set up of detection zone 800 may involve the user identifying which of two or more people to track, for example, if there are other patients, caregivers, visitors, etc. within view 600.

The 2-D boundary for detection zone 800 could be used by itself, or a depth 810 can be set for the detection zone 800. Depth 810 may be useful for detecting motion toward and away from the 3D motion sensor, as well as for distinguishing between person 100C to be monitoring and objects or other people who might pass in front of or behind person 100C. In this regard, the detection zone 800 may serve one or more purposes, including helping the system to "lock-on" to a particular person to be monitored even when there are other people or skeleton- or blob-looking objects in the room. The detection zone 800 may also reduce the area or volume of view 600 (i.e., the amount of image data collected by 3D motion sensor 110) that is analyzed by the computerized monitoring system 120 and/or communicated between various system components, thereby reducing the processing capacity, memory capacity, and/or communication bandwidth required for system operation.

Figure 9:
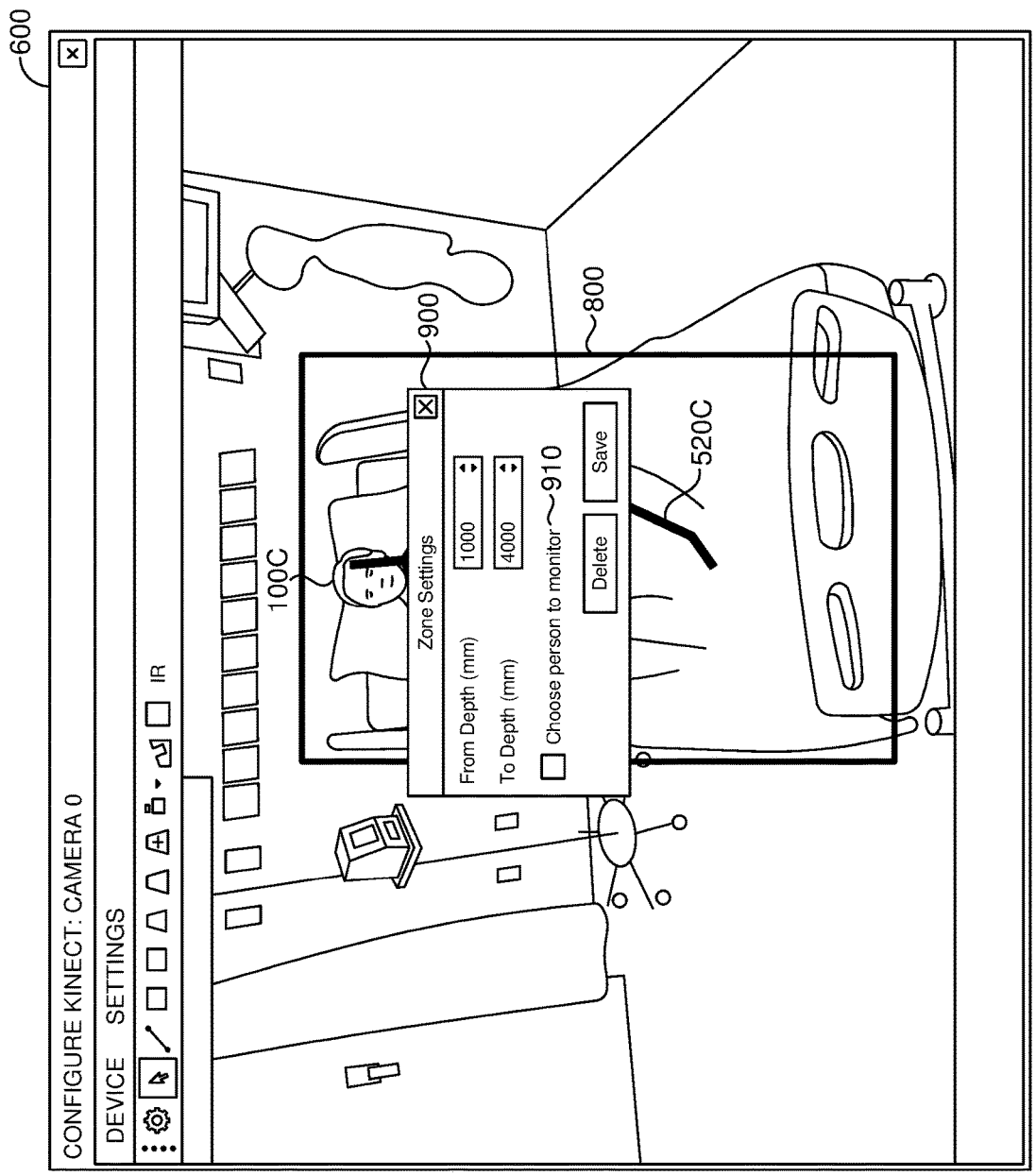
FIG. 9 is an exemplary configuration view in accordance with aspects of this disclosure.
Figure 10:
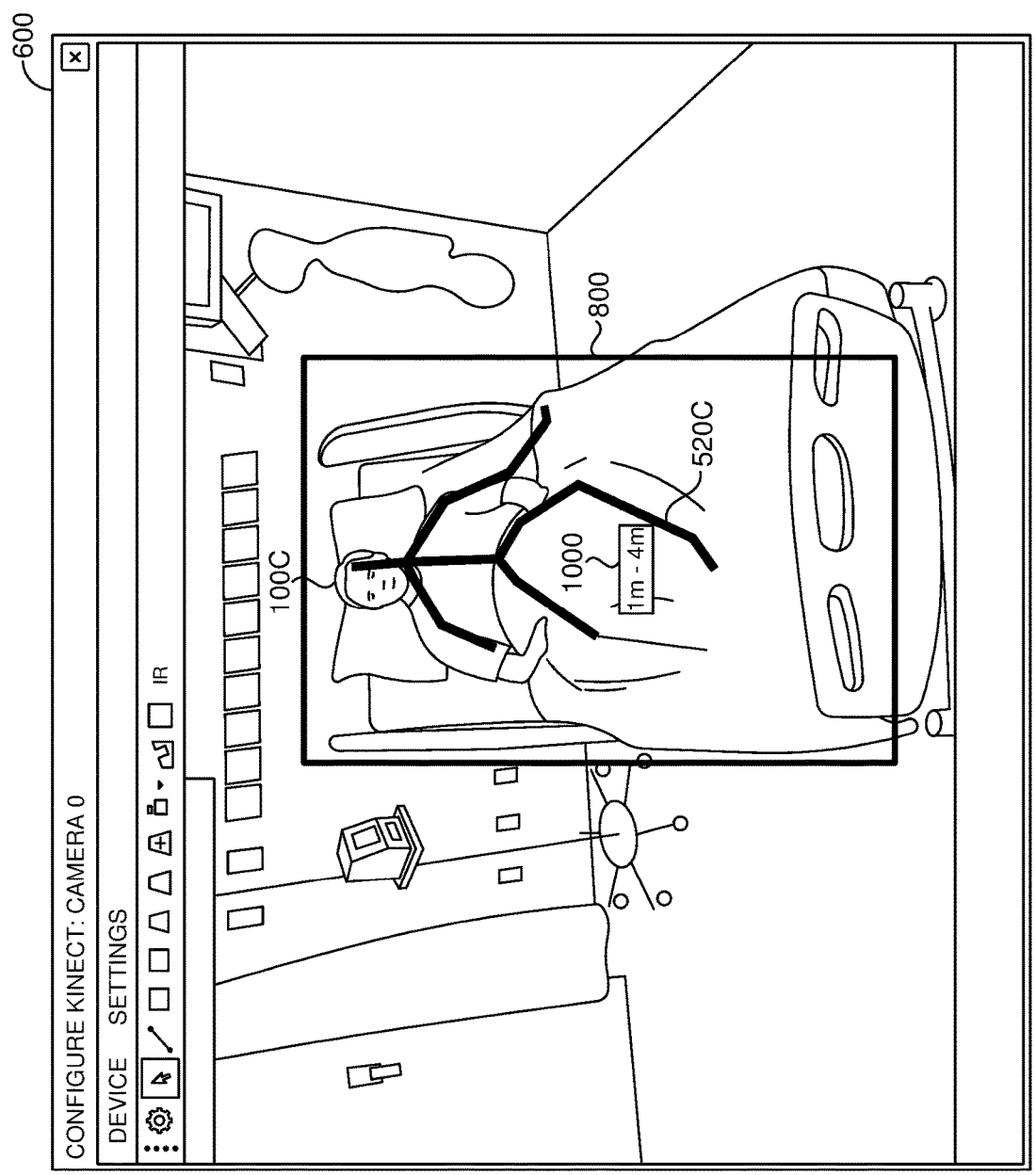
FIG. 10 is an exemplary configuration view in accordance with aspects of this disclosure.

As shown in FIG. 9, depth 810 may be reviewed and/or set by typing in a range in mm, however, drag-and-drop, pull-to-expand, or free-hand tools could be used to define depth 810, as in configuration menu 900. Alternately, or additionally, depth 810 could be entered in any other desired distance or volume measurement unit (e.g., inches, feet, meters, yards, cubic millimeters, cubic inches, etc.). Configuration menu 900 may provide the user an option to delete or save a particular setting for depth 810 of detection zone 800. FIG. 10 shows view 600, with modified depth 1000 relative to depth 810 shown in FIG. 8 to the range set using configuration menu 900 in FIG. 9.

Alternately or additionally, configuration menu 900 may include an option 910 to choose a person to be monitored. This option might be presented as a selector button that leads to a different menu, as a drop-down menu, or as any desired selection option. Option 910 may allow a user to click on a person in the image of the room, selecting that person for monitoring. Or option 910 may present a screen with the people in the room (as detected, for example, using blob or skeleton analysis) with identifiers, such as letters or numbers, and allow a user to type in or select the identifier of the person to be monitored. Option 910 might present an option to identify or select a particular individual by name or identification number, for example, a patient's name or a patient identification number. The system might act on the identification of a particular individual directly, e.g., by receiving a wireless identifier for the person identified and monitoring that person based on the direction of the signal for the wireless identifier. The system might act on the identification of the particular individual indirectly, e.g., by obtaining a photograph from a medical record of a patient identified by name, and using facial recognition, voice recognition, or biometric measurements (such as the distance between joints) to identify the patient as the person to be monitored. Option 910 and/or a submenu may present options as to how the monitored person should be tracked, as by wireless transmission, facial recognition, voice recognition, biometric measurements, or a combination thereof. The user may still manually set the depth for the monitoring zone, or may allow or select an option for the system to automatically establish a monitoring and/or detection zone around the person identified for monitoring. A similar option may be presented on other set-up screens, so that a user may select a person to be monitored and use automatic set-up for most set-up steps, or for only particular steps, such as establishing the depth of a monitoring and/or detection zone, or may abandon manual set-up and elect automatic set-up during the process.

Figure 11:
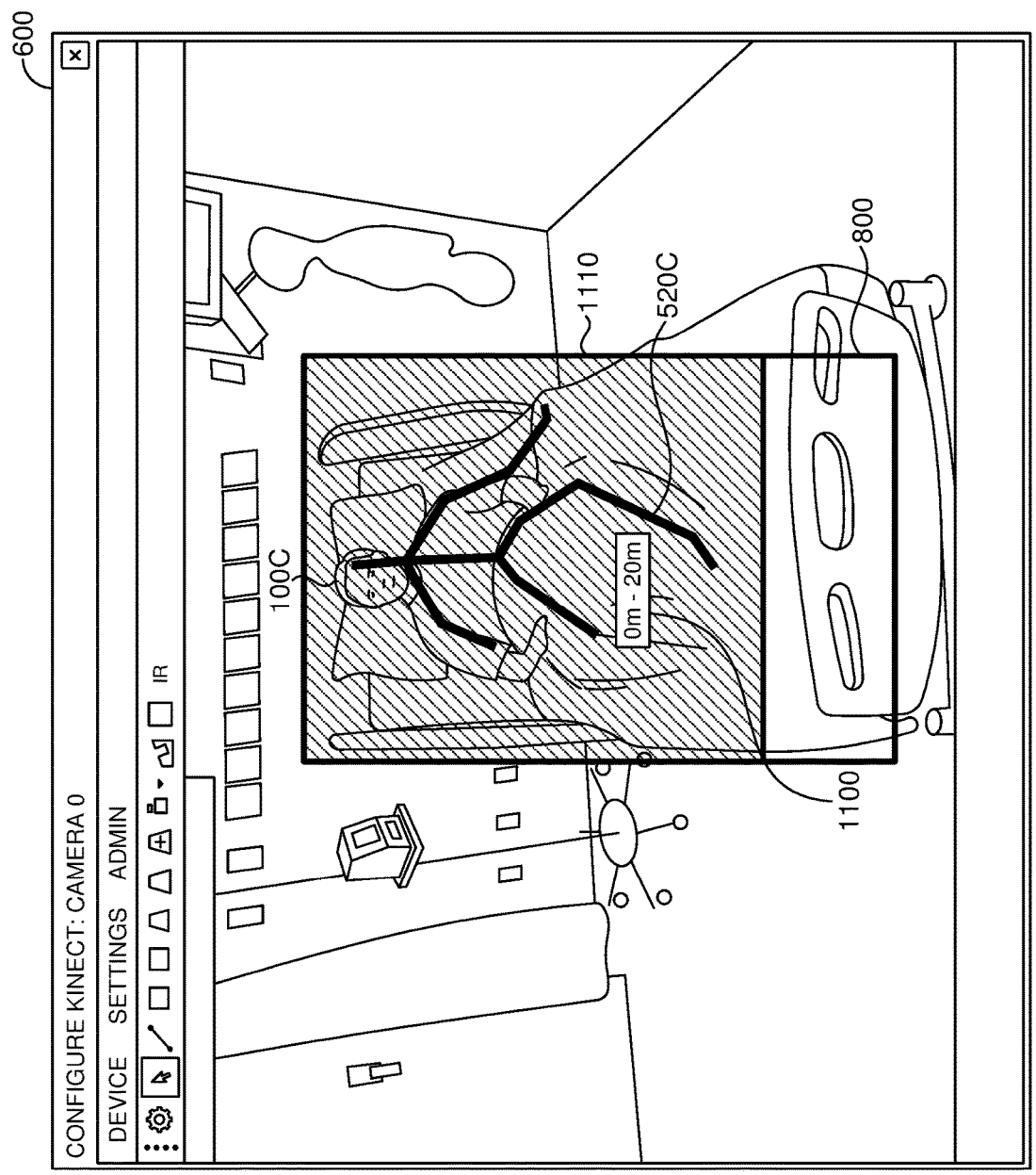
FIG. 11 is an exemplary configuration view in accordance with aspects of this disclosure.
Figure 12:
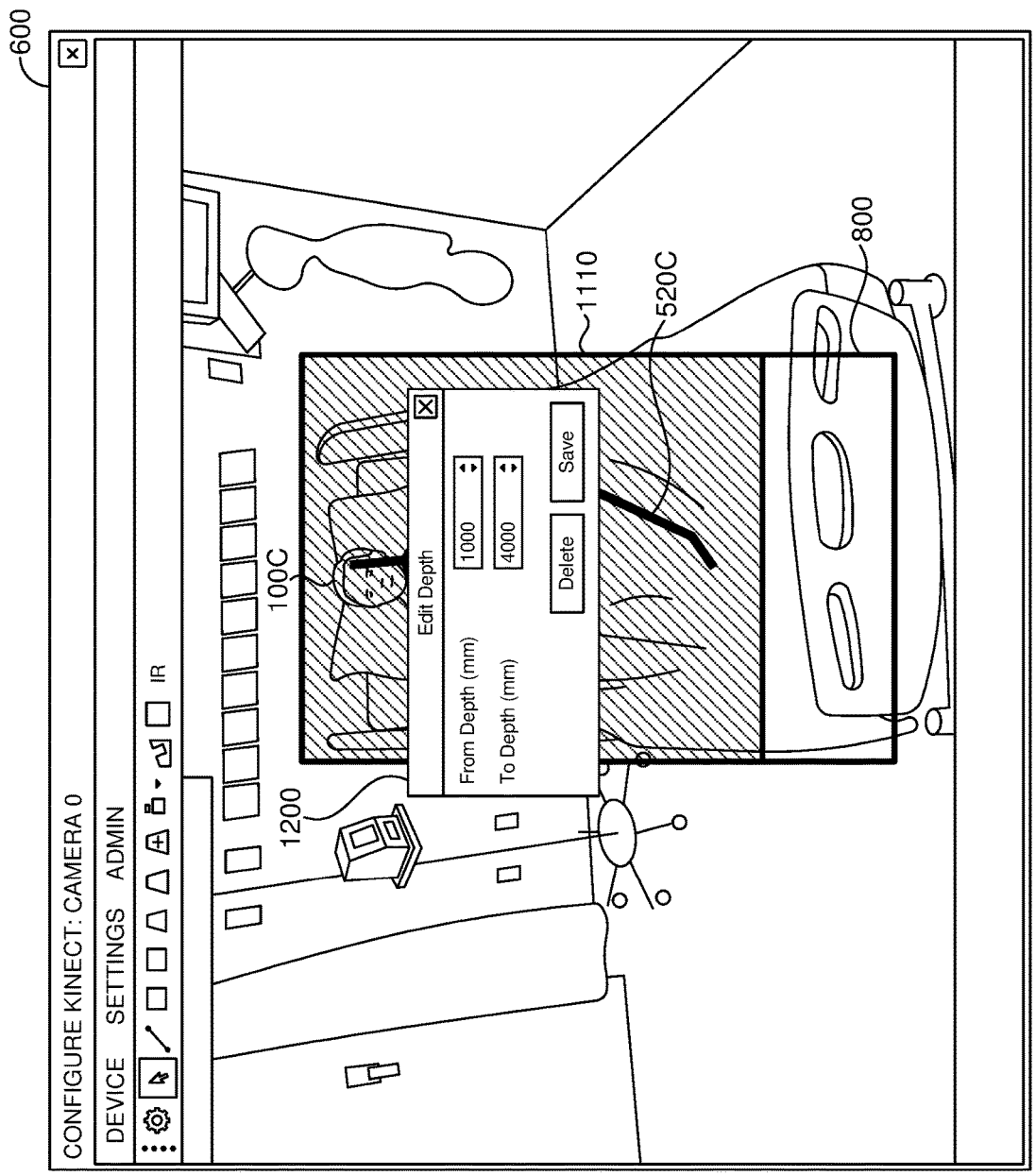
FIG. 12 is an exemplary configuration view in accordance with aspects of this disclosure.
Figure 13:
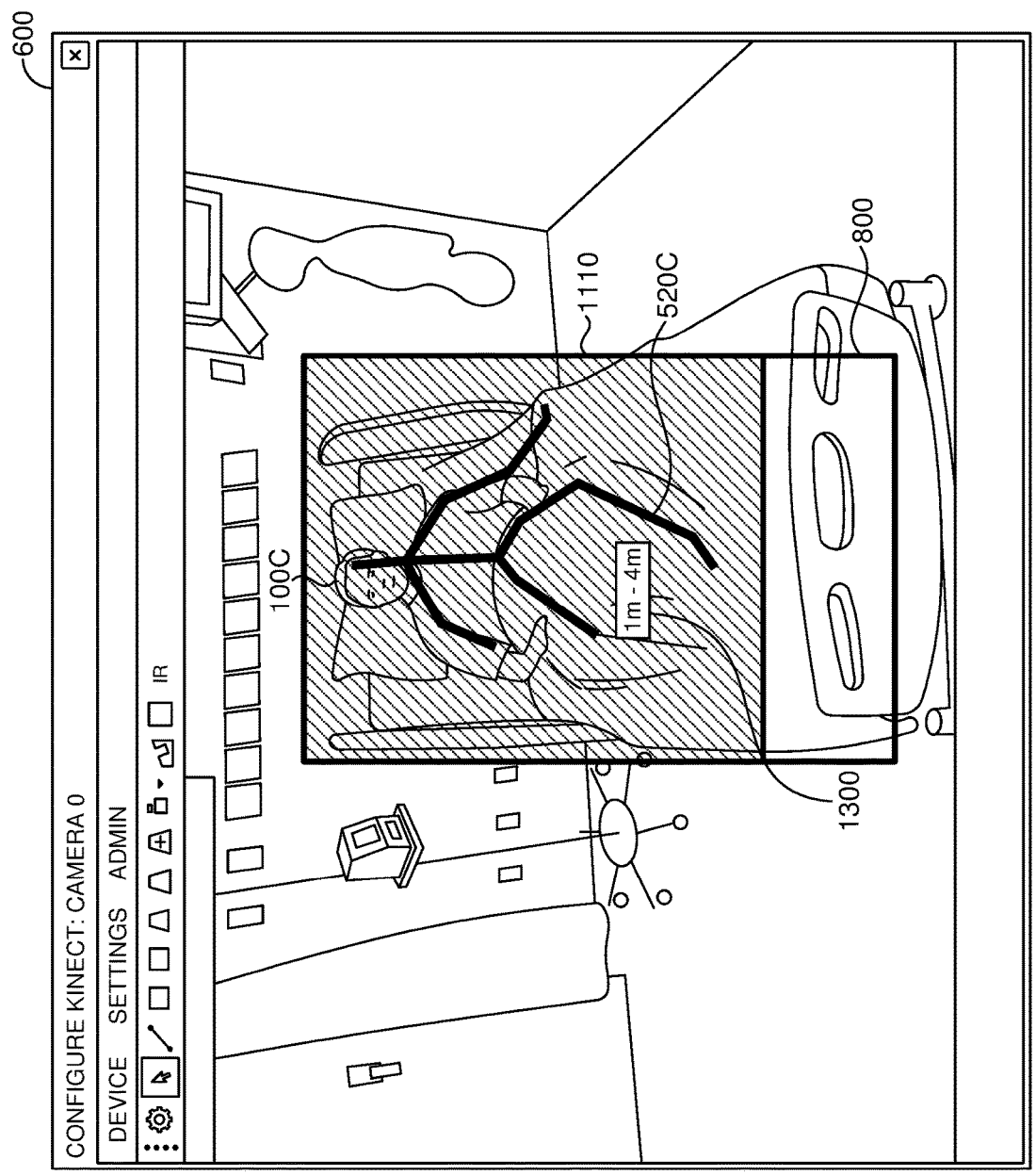
FIG. 13 is an exemplary configuration view in accordance with aspects of this disclosure.

In addition to or instead of a detection zone 800, the system may establish or allow a user to set up and/or modify a seizure detection zone 1110, as shown in FIG. 11. The seizure detection zone 1110 may be somewhat smaller than the detection zone 800, if a detection zone 800 is used. Compared to the detection zone 800, the seizure detection zone 1110 may focus more particularly on specific landmarks to be monitored for motion consistent with a seizure, such as person 100C's face or shoulders. Seizure detection zone 1110, like detection zone 800, can be automatically generated, automatically generated and presented to a system user for review and possible modification, or generated by a system user. Seizure detection zone 1110 may likewise include a depth 1100 or volume, which may be edited, as using configuration menu 1200 in FIG. 12. FIG. 13 shows a seizure detection zone 1110 with a modified depth 1300 compared to the depth 1100 shown in FIG. 11.

Figure 14:
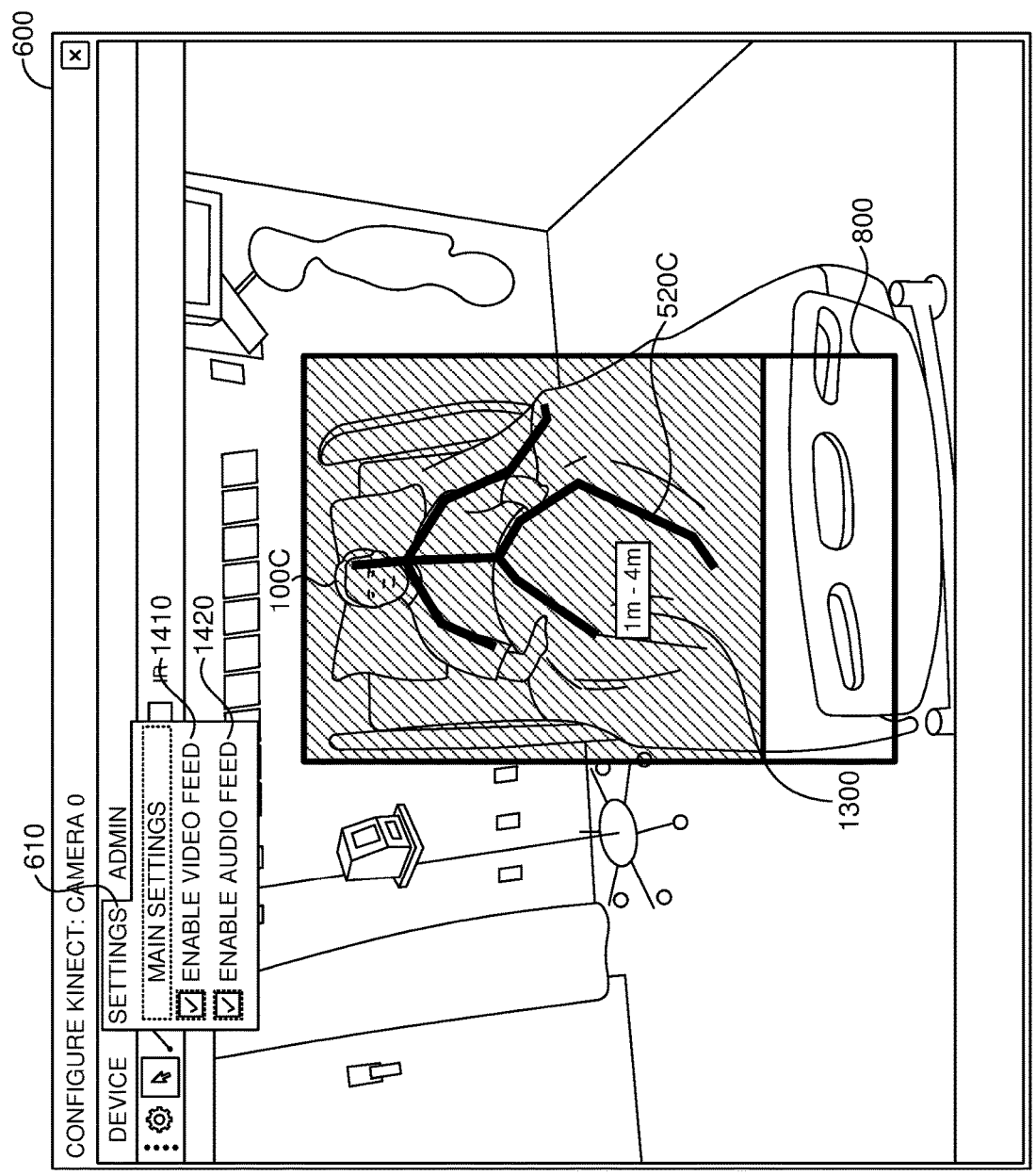
FIG. 14 is an exemplary configuration view in accordance with aspects of this disclosure.

Settings menu 610 may provide other configurable options. For example, as shown in FIG. 14, settings menu 610 may present options for enabling and/or disabling video feed 1410 and/or audio feed 1420. Disabling video and/or audio feed may be desirable to protect patient privacy, for example, when the person being monitored is receiving visitors, bathing, getting dressed, etc. While the invention may be practiced without audio data, an audio feed may be helpful for receiving confirmations from person 100C following an apparent seizure, or for detecting requests for help or other sounds that may tend to confirm that person 100C does or does not require help. For example, the system may use voice recognition to identify whether person 100C says something like "I am OK," or groans, cries, or asks for help. Alternately, or additionally, an attendant, for example, at central monitoring system 170, may enable audio feed to interpret words or sounds from the monitored room or area. In some aspects, a human attendant or monitor may enable audio feed, or the audio feed may be automatically enabled, if the system is unable to interpret or classify sounds from person 100C. The use of audio feed and/or automated audio analysis may permit a patient to call for help or for services, such as a meal, without having to be within reach of a physical device like a phone or call button.

Figure 15:
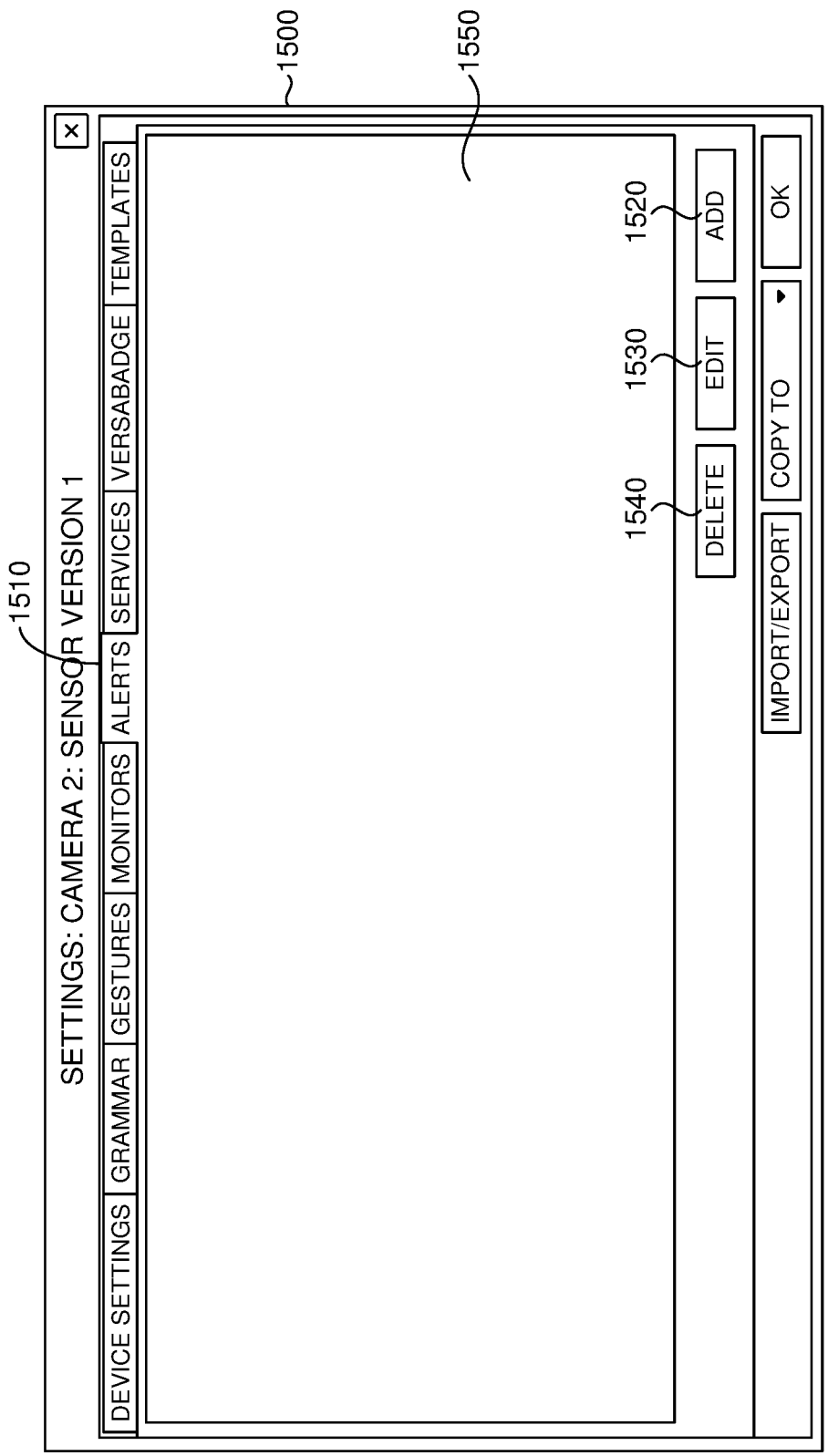
FIG. 15 is an exemplary configuration view in accordance with aspects of this disclosure.

Under the "Main Settings" submenu of settings menu 610 or any other suitable configuration menu or submenu, a user may be permitted to configure, review, and/or modify alerts. As shown in FIG. 15, an alert configuration view 1500 may include an alerts tab 1510 or sub-menu, and an alerts configuration display area 1550. As shown in FIG. 15, no alerts are configured, and the alerts configuration display area 1550 is blank. A user wishing to configure an alert may do so using "Add" button 1520 or alternate selection mechanism, such as a radio button, submenu, drop down menu, etc.

Figure 16:
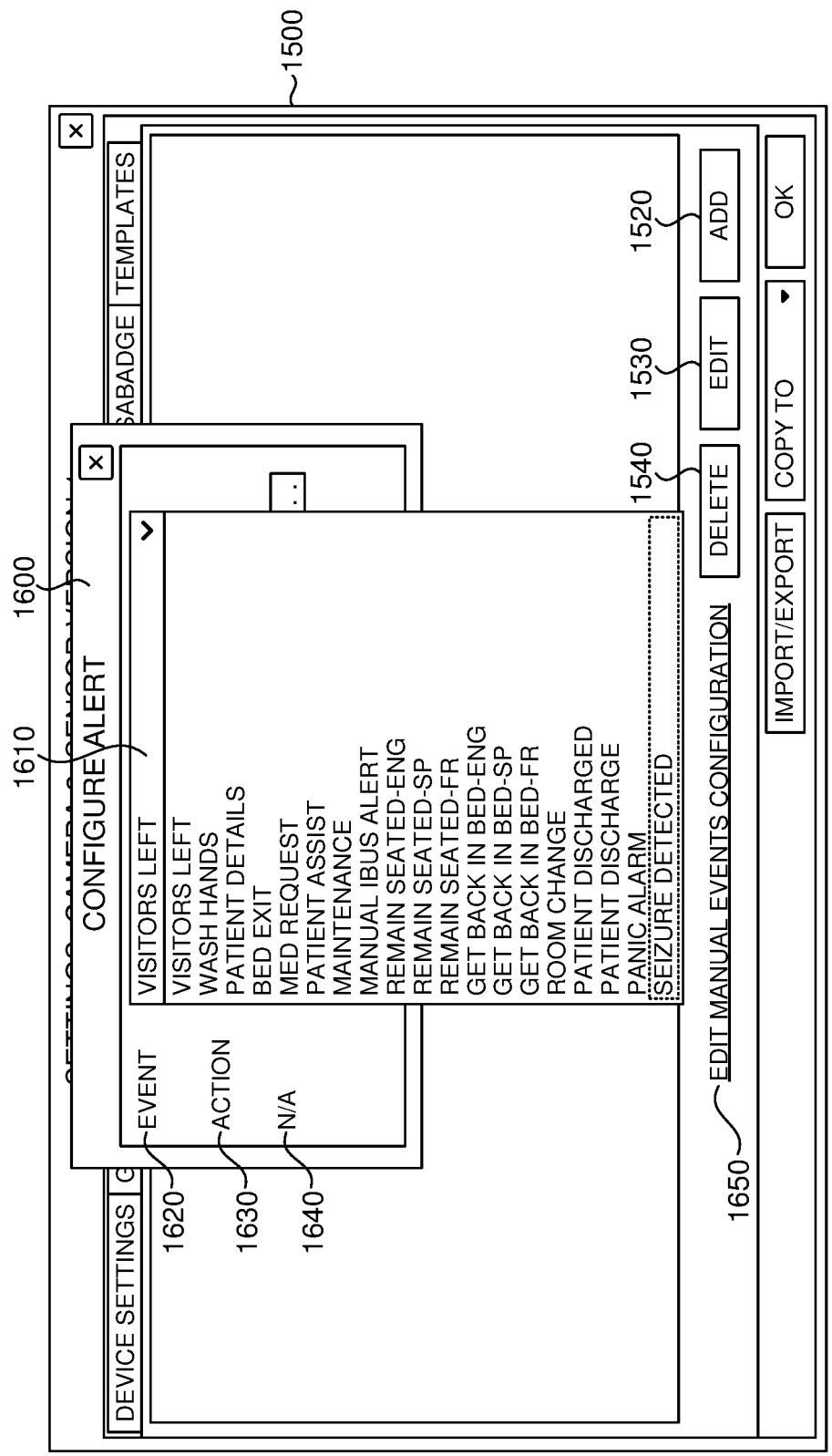
FIG. 16 is an exemplary configuration view in accordance with aspects of this disclosure.

As shown in FIG. 16, on selecting "Add" button 1520, the user is presented with an alert configuration submenu 1600.

Figure 17:
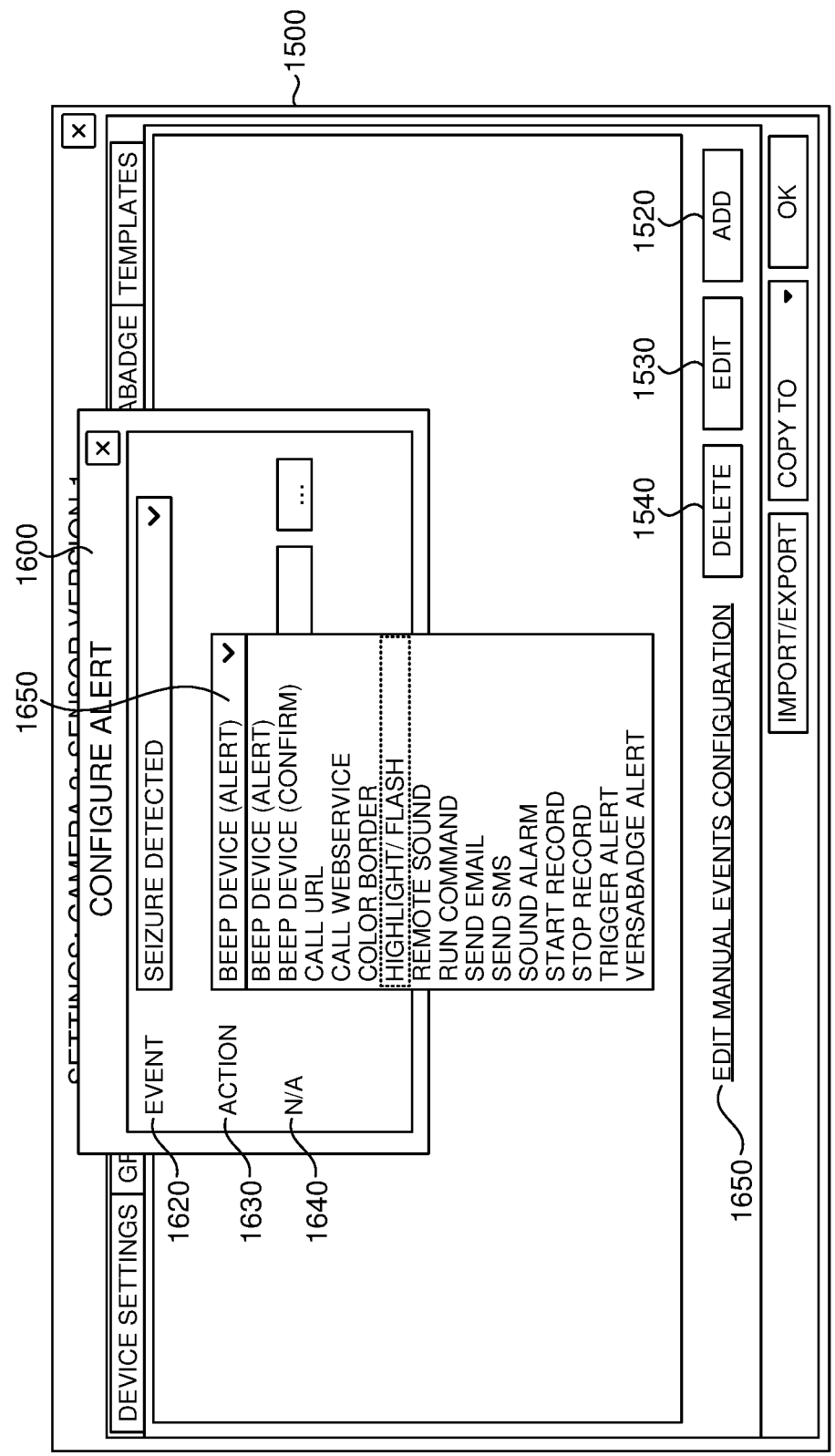
FIG. 17 is an exemplary configuration view in accordance with aspects of this disclosure.
Figure 18:
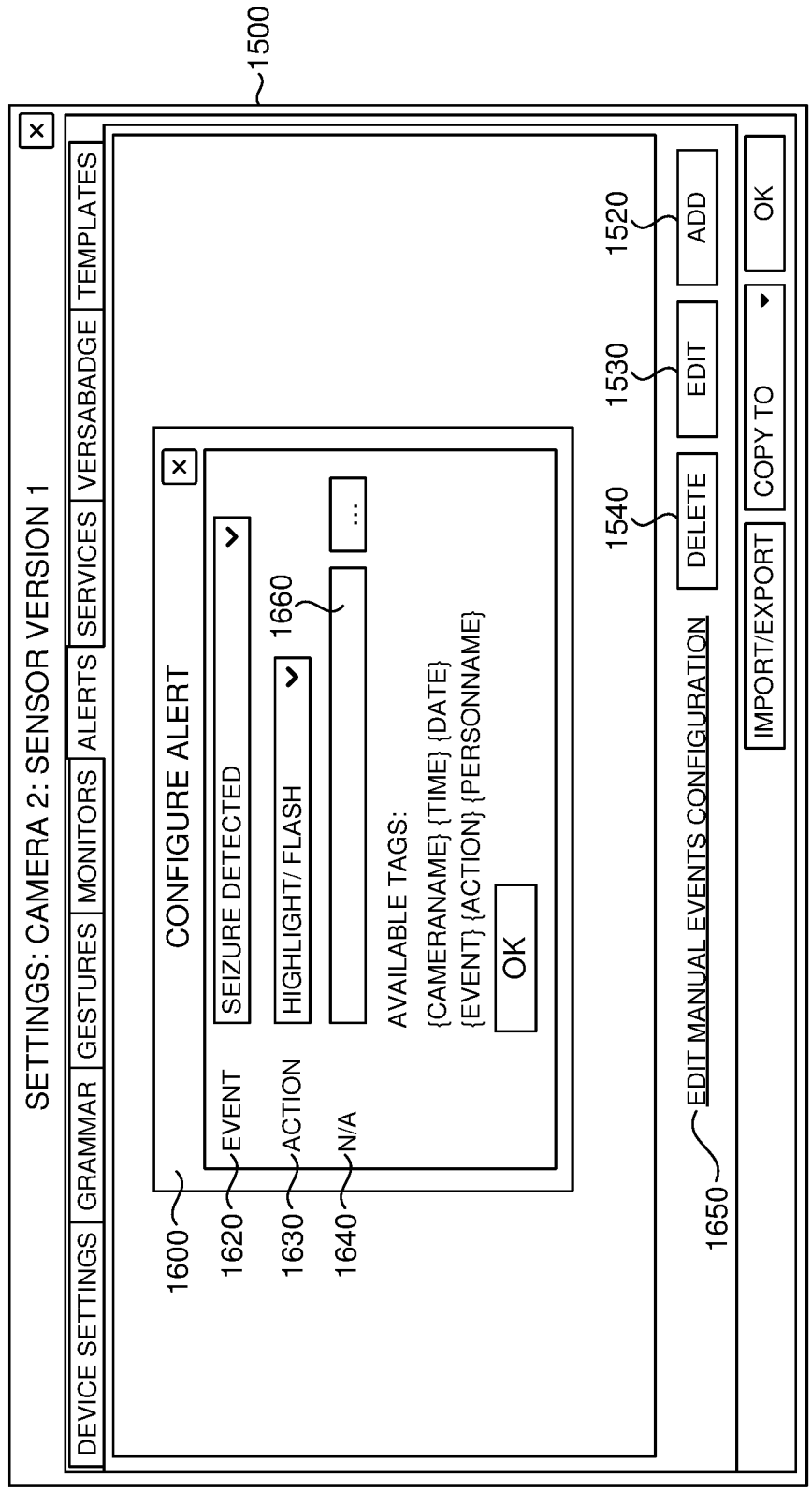
FIG. 18 is an exemplary configuration view in accordance with aspects of this disclosure.

As shown, the alert configuration submenu 1600 presents and option to specify an event 1620. A drop down menu 1610 is shown to present pre-programmed events of interest, including "Seizure Detected". FIG. 17 shows the alert configuration submenu 1600 after selecting "Seizure Detected" from the event drop down menu 1610. The user may then specify an action 1630 to be taken upon occurrence of the selected event, using drop down menu 1650. As shown, the option highlight/flash is selected as the action to take if a seizure is detected. As shown in FIG. 18, the use may specify additional information 1640, using drop down menu 1660. In the particular example shown in FIG. 18, drop down menu 1660 is blank because there are no further options to configure for the particular combination of event 1620 and action 1630 specified by the user.

Depending upon the configuration of the system, highlight/flash may refer to the display of video feed at the central monitoring system 170, or may refer to highlighting or flashing lights or a visual warning system in or near the person 100C's room or location. The system might be configured to option both or even additional options related to highlighting/flashing in response to an event. In such circumstances, these options might be presented as separate line items in action 1630 drop down menu 1650 (e.g., "Highlight/Flash-Room", "Highlight/Flash-Central Display"), or might be presented as additional information 1640 in drop down menu 1660. As another example, if the selected action 1630 were "Trigger Alert," the additional information 1640 drop down menu 1660 might include options for who to alert (e.g., the patient, a caregiver, a relative, a back-up caregiver, etc.) and/or how to transmit the alert (e.g., Mom-email, or Jane-cell phone). Drop down menu 1660 might also include options for the body segments or group of segments to monitor for particular alerts.

Figure 19:
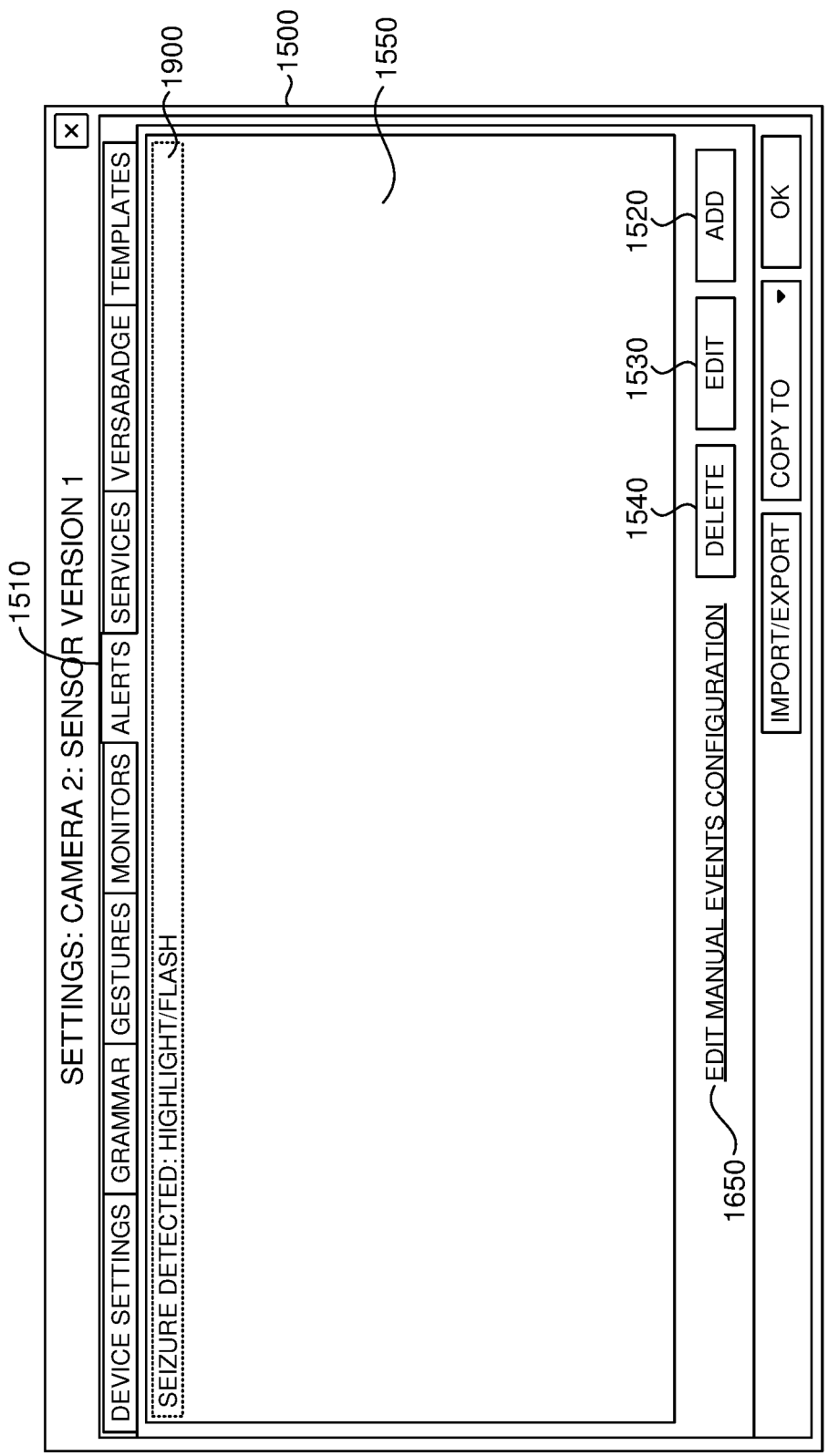
FIG. 19 is an exemplary configuration view in accordance with aspects of this disclosure.

Having configured an alert 1900, the alert 1900 becomes visible in the alerts configuration display area 1550 of the alert configuration view 1500, as shown in FIG. 19. A user viewing alert configuration view 1500 could now highlight alert 1900 and delete 1540 or edit 1530 alert 1900, or any other configured alert (not shown), or add 1520 additional alerts. Additional alerts might be configured to set multiple actions in response to the same event, or to notify multiple individuals of an alert or to transmit alerts in more than one medium (e.g., e-mail, SMS, voicemail, visual display/flashing lights, public announcement system, etc.). Alternately, or additionally, additional alerts might be configured for additional events, which might include, for example, gesture recognition for a specified gesture or a generalized gesture (e.g., waving arms) to signify a need for assistance, voice recognition for specific requests, or other image analysis events, including, without limitation, a patient fall or high potential for a patient fall, a patient entering a prescribed virtual zone, a patient leaving a prescribed virtual zone, the completion of or failure to complete certain healthcare prevention activities, and the like. Such alerts are described, for example, in U.S. Pat. Nos. 9,129,506; 9,159,215; U.S. patent application Ser. No. 14/724,969; U.S. patent application Ser. No. 14/599,498; U.S. patent application Ser. No. 14/623,349; U.S. patent application Ser. No. 14/757,593; and U.S. patent application Ser. No. 14/757,877, each of which is hereby incorporated by reference in its entirety. The original alert or additional alerts could also be configured manually, rather than selecting a pre-configured event from a menu, by selecting the "Edit Manual Events Configuration" menu 1650.

Figure 20:
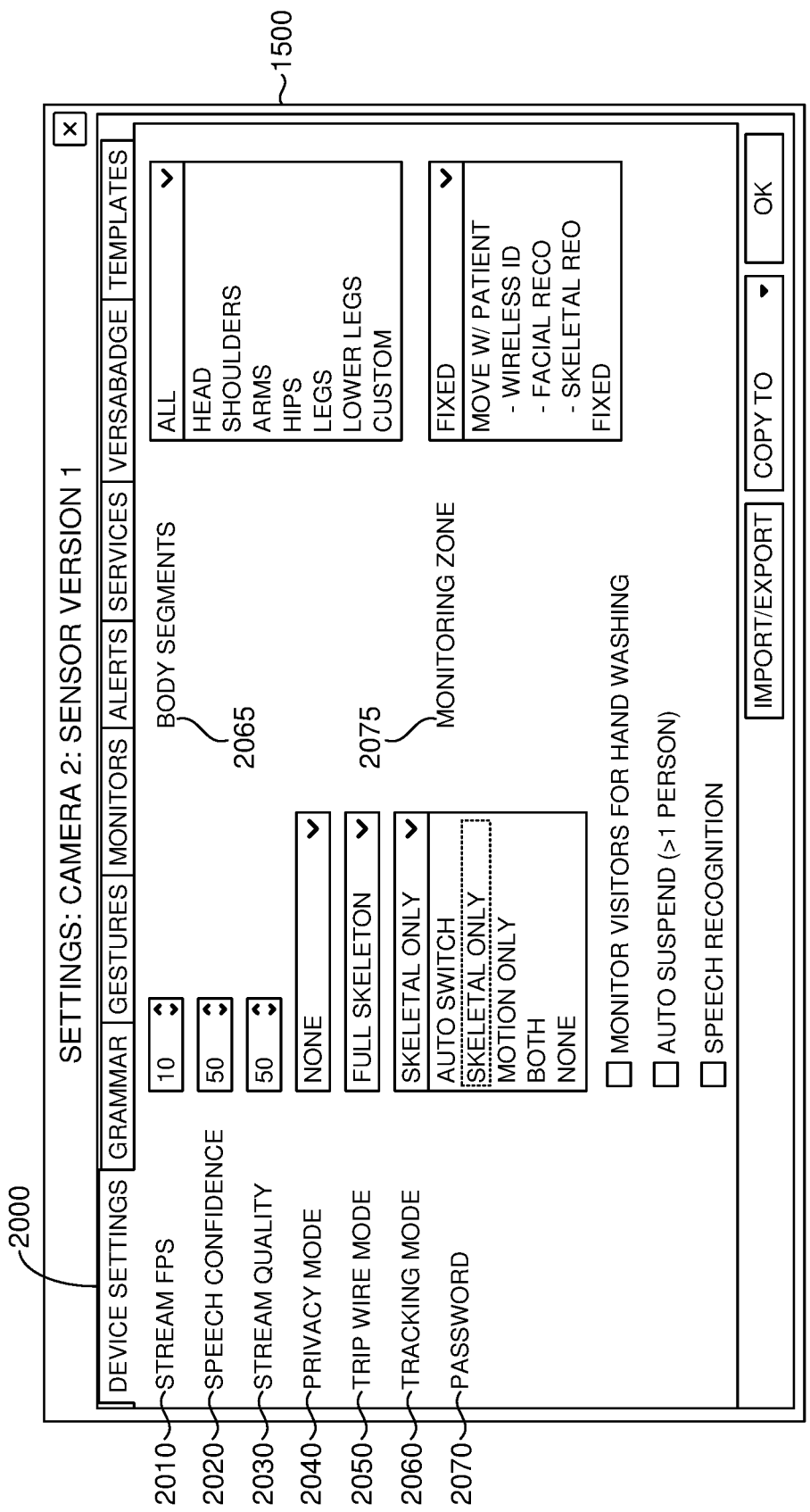
FIG. 20 is an exemplary configuration view in accordance with aspects of this disclosure.

Other settings 2000, as shown in FIG. 20, may include the rate at which image frames are displayed (e.g., frames per second or FPS 2010), the threshold for determining whether the person being monitored is speaking and/or what the person is saying ("Speech Confidence" 2020), and the quality or resolution of the image stream ("Stream Quality" 2030). These factors may influence the communications bandwidth and/or computer processing capacity required by the system. Other options may include a privacy mode 2040. For example, in addition to turning a video feed on and off to protect patient privacy, displays may be set to use pixilation, shading, coloration, stick figures, or other methods to make it more difficult to identify a specific person or to discern specific details about the person's dress or body that are not germane to the monitoring. Another option may include a "Trip Wire Mode" 2050 for identifying when a person—either the person being monitored or a caregiver or other—enters a defined trip wire zone around the patient. The trip wire zone may correspond to the skeleton detection zone or seizure detection zone, or may be configured separately. A trip wire zone may be useful, for example, for monitoring whether a patient is trying to self-adjust medical equipment (such as a breathing tube, enteric feeding tube, or IV line), or for preventing a disoriented patient from wandering off, or for monitoring close contact between the patient and a caregiver. The tracking mode 2060 can also be configured, for example, to choose between skeletal tracking, blob recognition, facial tracking, etc. A password 2070 may be required to save system configuration choices and/or changes, to access information about the person being monitored, to access images of the person being monitored, and/or to acknowledge and/or clear alerts or alarms. More, fewer, and/or different configuration settings may be provided for particular institutions, patients, or users.

As noted with reference to FIG. 9, additional setting options may relate to which body segments are monitored, shown as body segments 2065. Monitoring zone 2075 may further be specified as fixed (e.g., as identified by a user or the system around a bed or other portion of the room) or moveable. If monitoring zone 2075 is moveable, monitoring zone 2075 drop down menu or a sub-menu may allow the user to specify how monitoring zone should be adjusted as the patient moves, e.g., by tracking a wireless transmitter, using facial recognition, using voice recognition, using skeletal recognition (e.g., track this skeleton wherever it goes within visual range), using biometrics (e.g., distances between points on a person's body), or others, including combinations of these methods.

Figure 21:
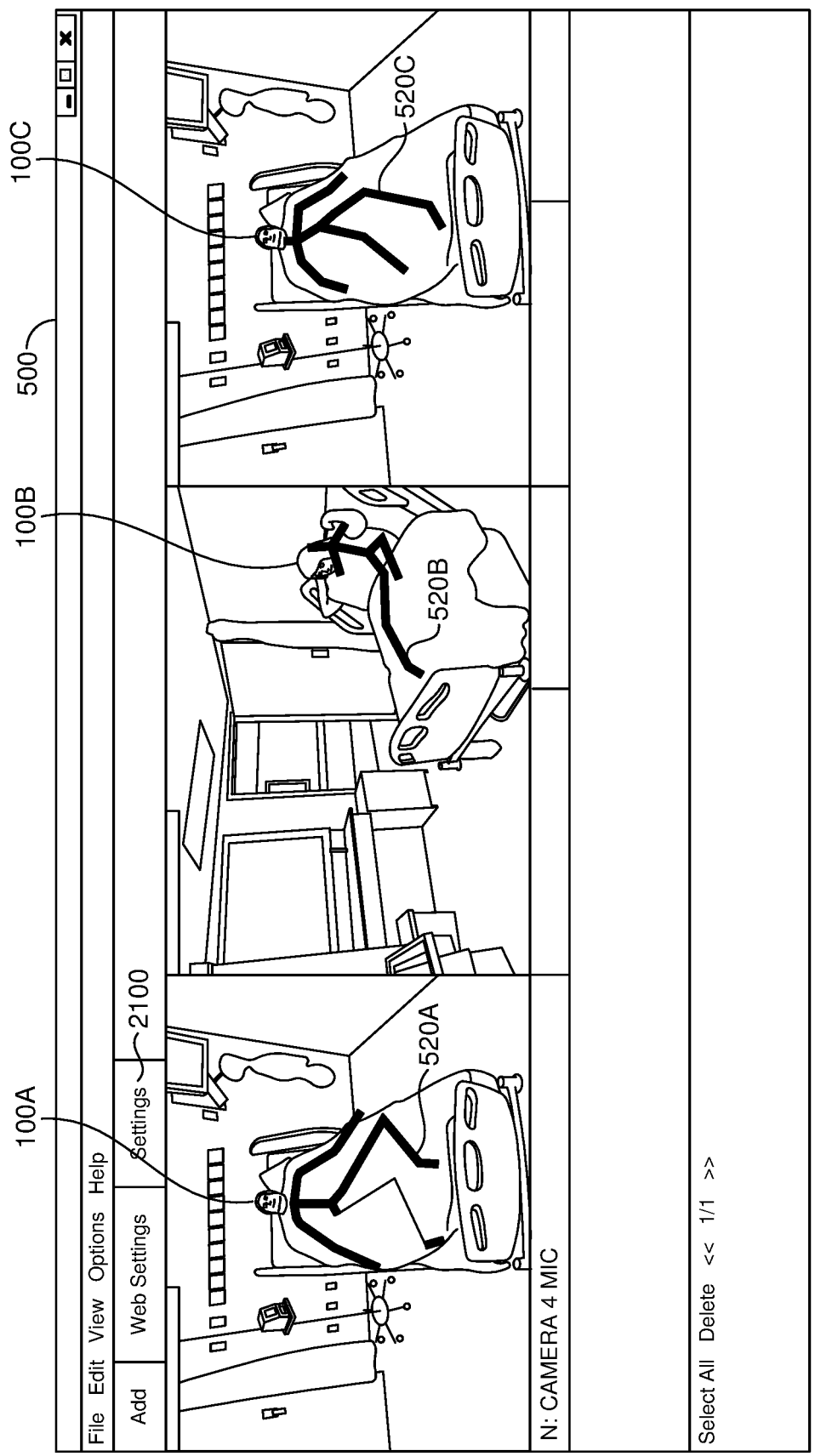
FIG. 21 is an exemplary monitoring view in accordance with aspects of this disclosure.

FIG. 21 shows a monitoring display view 500 as might be displayed at central monitoring primary display 310. Aggregated image feeds for people 100A, 100B, and 100C are displayed. As shown, each image feed includes a skeleton image 520A, 520B, 520C, to highlight the body parts being tracked. However, other tracking methods could be used, including without limitation, blob tracking, facial tracking, or particular physiological reference points (e.g., right shoulder vs. skeletal arm segment). Further, the tracking points need not be displayed for routine monitoring, and could be disabled, for example, using settings menu 2100 on the central monitoring primary display 310. Settings menu 2100 might also be used to configure settings for all displays in the aggregated image feeds, as described above for configuring settings for a particular image feed for a particular person. That is, settings menu 2100 might be used to turn off audio feed across all data feeds, or to turn on privacy settings such as shading or pixilation. These settings could then be further adjusted for a particular display of a particular person, e.g., if audio is desired for a particular display, it could be turned on for that display after turning off audio feeds, generally.

From the foregoing, it will be seen that this disclosure is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A computerized method for detecting seizure symptoms, the method implemented by one or more processors and comprising:
   receiving, from one or more 3D motion sensors, image data capturing a person;
   establishing a detection zone defining an area or volume around the person, the detection zone being less than an entire area or an entire volume of view of the one or more 3D motion sensors;
   detecting the person has moved based on the image data from one or more 3D motion sensors;
   based on the image data from within the detection zone, identifying a pattern of movement consistent with a seizure by determining a rate of movement by assessing a change in position over time of one or more reference points of the person using blob detection analysis, skeleton analysis, or both, wherein the one or more reference points of the person is based on a type of seizure risk for the person; and
   communicating a determination that movement of the person is consistent with the seizure.

2. The computerized method of claim 1 further comprising recording the pattern of movement consistent with the seizure.

3. The computerized method of claim 1 further comprising automatically adjusting the detection zone to maintain the detection zone around the person as the person moves.

4. The computerized method of claim 3, wherein automatically adjusting the detection zone to maintain the detection zone around the person as the person moves comprises maintaining a constant spatial relationship between one or more reference points of the person and a boundary of the detection zone.

5. The computerized method of claim 3, wherein automatically adjusting the detection zone to maintain the detection zone around the person as the person moves comprises identifying a direction of at least one of one or more reference points of the person relative to the one or more 3D motion sensors and moving the detection zone based on directional information.

6. The computerized method of claim 1, wherein the one or more reference points of the person is limited to reference points on the person's lower body.

7. The computerized method of claim 1, wherein the determination is communicated to a central monitoring system, and upon communicating the determination to the central monitoring system, a display of images of the person captured by the one or more 3D motion sensors as the image data is moved from a primary monitoring display to an alert monitoring display.

8. A system for detecting seizures, the system comprising:
   one or more 3D motion sensors located to provide the one or more 3D motion sensors with a view of a person to be monitored, the 3D motion sensors configured to collect a series of images of the person;
   a computerized monitoring system communicatively coupled to the one or more 3D motion sensors, the computerized monitoring system configured to:
   receiving, from the one or more 3D motion sensors, image data of the person;
   establishing a detection zone defining an area or volume around the person, the detection zone being less than an entire area or an entire volume of view of the one or more 3D motion sensors;
   detecting the person has moved based on the image data from one or more 3D motion sensors; and
   based on the image data from within the detection zone, identifying a pattern of movement consistent with a seizure by determining a rate of movement by assessing a change in position over time of one or more reference points of the person using blob detection analysis, skeleton analysis, or both, wherein the one or more reference points of the person is based on a type of seizure risk for the person; and
   a computerized communication system communicatively coupled to the computerized monitoring system, the computerized communication system configured to send an alert to one or more designated recipients when it is determined that the pattern of movement is consistent with the seizure.

9. The system of claim 8, further comprising a central monitoring system communicatively coupled to the computerized communication system, the central monitoring system configured to display at least a portion of the series of images of the person.

10. The system of claim 9, wherein the central monitoring system comprises a primary display and an alert display.

11. The system of claim 10, wherein the central monitoring system receives the alert that the pattern of movement is consistent with a seizure, and, upon receiving the alert, a display of images of the person captured by the one or more 3D motion sensors is moved from the primary display to the alert display.

12. The system of claim 8, wherein, upon determining the pattern of movement is consistent with a seizure, the computerized monitoring system automatically communicates the determination to the computerized communication system, wherein the computerized communication system transmits the alert to the one or more designated recipients.

13. The system of claim 12, wherein the computerized monitoring system is further configured to automatically adjust the detection zone to maintain the detection zone around the person as the person moves.

14. The system of claim 13, wherein automatically adjusting the detection zone to maintain the detection zone around the person as the person moves comprises maintaining a constant spatial relationship between one or more reference points of the person and a boundary of the detection zone.

15. The system of claim 8, wherein identifying the pattern of movement consistent with a seizure further comprises determining a duration of movement.

16. The system of claim 8, wherein the one or more reference points of the person is limited to reference points on the person's lower body.

* * * * *